United States Patent
Phillips

(10) Patent No.: US 6,970,773 B2
(45) Date of Patent: Nov. 29, 2005

(54) APPARATUS AND METHOD FOR REDUCING INDUCED DRAG ON AIRCRAFT AND OTHER VEHICLES

(75) Inventor: Warren F. Phillips, Paradise, UT (US)

(73) Assignee: Utah State University, North Logan, UT (US)

(*) Notice: Subject to any disclaimer, the term of this patent is extended or adjusted under 35 U.S.C. 154(b) by 0 days.

(21) Appl. No.: 10/846,852

(22) Filed: May 14, 2004

(65) Prior Publication Data

US 2005/0216141 A1  Sep. 29, 2005

Related U.S. Application Data

(63) Continuation of application No. 10/799,568, filed on Mar. 11, 2004, now abandoned.

(60) Provisional application No. 60/552,252, filed on Mar. 10, 2004.

(51) Int. Cl.$^7$ ............................................. G05D 1/00
(52) U.S. Cl. ............................................. 701/7; 701/3
(58) Field of Search .................................. 701/3, 7, 1

(56) References Cited

U.S. PATENT DOCUMENTS

| | | | |
|---|---|---|---|
| 2,043,275 A | 6/1936 | Weick | |
| 2,418,273 A | 4/1947 | Moore | |
| 2,614,774 A | 10/1952 | Donovan | |
| 3,576,301 A | 4/1971 | Stickle | |
| 3,617,018 A | 11/1971 | Baetke | |
| 3,698,664 A | 10/1972 | Bonney | |
| 3,721,406 A | 3/1973 | Hurlbert | |
| 4,445,655 A | 5/1984 | Hueberger | |
| 4,460,138 A | 7/1984 | Sankrithi | |
| 4,614,320 A | 9/1986 | Rutan | |
| 4,854,528 A | 8/1989 | Hofrichter | |
| 4,892,274 A | 1/1990 | Pohl et al. | |
| 4,892,460 A | 1/1990 | Volk | |
| 5,167,383 A | 12/1992 | Nozaki | |
| 5,551,651 A | 9/1996 | Hendrickson | |
| 5,681,014 A | 10/1997 | Palmer | |
| 5,794,893 A | 8/1998 | Diller et al. | |
| 5,836,550 A | 11/1998 | Paez | |
| 5,992,792 A | 11/1999 | Árnason | |
| 6,079,672 A | 6/2000 | Lam et al. | |

(Continued)

FOREIGN PATENT DOCUMENTS

JP 4-63799 2/1992

OTHER PUBLICATIONS

Anderson, "Charts for Determining the Pitching Moment of Tapered Wings with Sweepback and Twist," National Advisory Committee for Aeronautics, TN-483, Dec. 1933.

(Continued)

*Primary Examiner*—Yonel Beaulieu
(74) *Attorney, Agent, or Firm*—Clayton, Howarth & Cannon, P.C.

(57) ABSTRACT

A method and apparatus for varying the washout of a wing such that induced drag is minimized during a flight. The washout is varied pursuant to an optimized twist distribution that depends on the wing planform and an optimized twist amount which depends, at least in part, upon the operating conditions, including those parameters used to determine the lift coefficient. The optimum twist may be employed by geometric or aerodynamic twist, including full spanwise control surfaces used to simultaneously provide roll control, high-lift and minimum induced drag. The optimum twist may also be employed be twisting just a portion of the wing or the entire wing, either geometrically or aerodynamically.

154 Claims, 13 Drawing Sheets

U.S. PATENT DOCUMENTS

| | | | |
|---|---|---|---|
| 6,089,503 | A | 7/2000 | Volk |
| 6,145,791 | A | 11/2000 | Diller et al. |
| 6,349,903 | B2 | 2/2002 | Caton et al. |
| 6,535,158 | B2 | 3/2003 | Wilkerson et al. |
| 6,554,229 | B1 | 4/2003 | Lam et al. |
| 6,641,089 | B2 | 11/2003 | Schwetzler et al. |
| 2001/0006207 | A1 | 7/2001 | Caton et al. |
| 2003/0057332 | A1 | 3/2003 | Schwetzler et al. |

OTHER PUBLICATIONS

Anderson, "Determination of the Characteristics of Tapered Wings," National Advisory Committee for Aeronautics, TR-572, May 1937.

Cohen, "A Method for Determining the Camber and Twist of a Surface to Support a Given Distribution of Lift," National Advisory Committee for Aeronautics, TN-855, Aug. 1942.

Datwyler, "Calculations of the Effect of Wing Twist on the Air Forces Acting on a Monoplane Wing," National Advisory Committee for Aeronautics, TN-520, Mar. 1935.

DeYoung et al., "Theoretical Symmetric Span Loading at Subsonic Speeds for Wings Having Arbitrary Plan Form," National Advisory Committee for Aeronautics, TR-921, Dec. 1948.

Falkner et al., "The Calculation of Aerodynamic Loading on Surfaces of Any Shape," Reports and Memoranda 1910, Aeronautical Research Council, London, Aug. 1943.

Filotas, "Solution of the Lifting Line Equation for Twisted Elliptic Wings," 8(10) J. Aircraft, pp. 835-836, Oct. 1971.

Glauert, "Theoretical Relationships for an Aerofoil with Hinged Flap," Reports and Memoranda 1095, Aeronautical Research Council, London, Jul. 1927.

Glauert et al., "The Characteristics of a Tapered and Twisted Wing with Sweep-Back," Reports and Memoranda 1226, Aeronautical Research Council, London, Aug., 1929.

Glauert, "The Monoplane Aerofoil," *The Elements of Aerofoil and Airscrew Theory*, Cambridge University Press, Cambridge, UK, pp. 137-155, 1926.

Hartshorn, "Theoretical Relationship for a Wing with Unbalanced Ailerons," Reports and Memorandum 1259, Aeronautical Research Council, London, Apr. 1929.

Munk, "On the Distribution of Lift along the Span of an Airfoil with Displaced Ailerons," National Advisory Committee for Aeronautics, TN-195, Jun. 1924.

Munk, "A New Relation between the Induced Yawing Moment and the Rolling Moment of an Airfoil in Straight Motion," National Advisory Committee for Aeronautics, TR-197, Jun. 1925.

Pearson, "Theoretical Span Loading and Moments of Tapered Wings Produced by Aileron Deflection," National Advisory Committee for Aeronautics, TN-589, Jan. 1937.

Pearson et al., "Theoretical Stability and Control Characteristics of Wings with Various Amounts of Taper and Twist," National Advisory Committee for Aeronautics, TR-635, Apr. 1937.

Pearson, "Span Load Distribution for Tapered Wings with Partial-Span Flaps," National Advisory Committee for Aeronautics, TR-585, Nov. 1937.

Phillips, "Lifting-Line Analysis for Twisted Wings and Washout-Optimized Wings," American Institute of Aeronautics and Astronautics, A1AA-2003-0393, Jan. 2003.

Phillips, "Lifting-Line Analysis for the Effects of Washout on Performance and Stability," 40(6) Journal of Aircraft, Nov.-Dec. 2003.

Phillips et al., "Lifting-Line Analysis of Roll Control and Variable Twist," American Institute of Aeronautics and Astronautics, A1AA-2003-4061, Jun. 2003.

Phillips et al., "Lifting-Line Analysis of Roll Control and Variable Twist," 41(2) Journal of Aircraft, pp. 1-11, Mar. 2004.

Stevens, "Theoretical Basic Span Loading Characteristics of Wings with Arbitrary Sweep, Aspect Ratio, and Taper Ratio," National Advisory Committee for Aeronautics, TN-1772, Dec. 1948.

APPARATUS AND METHOD FOR REDUCING INDUCED DRAG ON AIRCRAFT AND OTHER VEHICLES

CROSS-REFERENCE TO RELATED APPLICATIONS

This application is a continuation of co-pending U.S. patent application Ser. No. 10/799,568, filed Mar. 11, 2004, entitled "APPARATUS AND METHOD FOR REDUCING INDUCED DRAG ON AIRCRAFT AND OTHER VEHICLES." This application also claims the benefit of U.S. Provisional Application Ser. No. 60/552,252, filed on Mar. 10, 2004, now abandoned, entitled APPARATUS AND METHOD FOR REDUCING INDUCED DRAG ON AIRCRAFT. Both of the afore-mentioned applications are hereby incorporated by reference herein in their entireties, including but not limited to those portions that specifically appear hereinafter, the incorporation by reference being made with the following exception: In the event that any portion of the above-referenced applications is inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Disclosure.

The present disclosure relates generally to airfoils or watercraft structures, and more particularly, but not necessarily entirely, to airfoils utilizing washout to minimize induced drag.

2. Description of Related Art

Induced drag is caused by the generation of lift by a wing and is parallel to the relative wind into which the wing is flying. When a wing flies at the zero lift angle of attack there is no lift and therefore no induced drag. Conversely, when the angle of attack increases the wing produces more lift, therefore there is more induced drag. The magnitude of the induced drag depends on (1) the amount of lift being generated by the wing; and (2) on the shape and size of the wing, also known as wing planform. As might be expected, induced drag is undesirable while flying in that it results in diminished fuel economy as well as decreased airspeed. Induced drag also contributes to the stall characteristics of a given wing.

The prior art teaches various features that may be incorporated into a wing in order to reduce induced drag at high angles of attack. One of the more well known ways to reduce induced drag is to increase the wingspan. For example, this would include aircraft such as gliders, as well as high altitude spy planes such as the U2. It also includes to a lesser degree modern jet airliners. However, as the span is increased, the wing structural weight also increases and at some point the weight increase offsets the induced drag savings.

Another previously known method for reducing induced drag is to employ end plates onto the tips of the wings. The end plates served to block some of the vortices causing reduced drag. However, end plates are not employed widely due to their relative inefficiencies. Still another method for reducing drag is using winglets. Unlike the other methods mentioned above, the winglet does not strive to reduce induced drag so much as it uses it to create an offsetting thrust. However, winglets cannot be used on all planes due to performance considerations which are not discussed here. Other known attempts to reduce induced drag include wings with slotted edges and wings with fanned partial wings.

Tapered wings are also commonly used as a means for reducing induced drag. It can be shown that tapered wings with the right amount of taper have a lower reduced drag than an untapered wing. However, this reduction comes at a price. A tapered wing tends to stall first at in the region near the wingtips. This wingtip stall can lead to poor handling characteristics during stall recovery. Thus, tapered wings have commonly been used as a compromise solution.

Around the 1920s it was found that a flat elliptical shaped wing gave a uniform air deflection along the entire span, which minimized the induced drag. Elliptical shaped wings were used on the British SuperMarine Spitfire, a popular WWII fighter, to reduce induced drag. In fact, it can be shown that an elliptical wing produces the minimum possible induced drag for all angles of attack. Unfortunately, there are several problems with elliptical wings. First, elliptical shaped wings are cost prohibitive. While this barrier is less important today than it once was, provided that the designer is willing to use modern composite materials. However, making an elliptical shape out of aluminum is quite difficult and therefore expensive. Next, elliptical wings have undesirable stall characteristics. It is much safer to design an airplane so that the wing stalls first at the root, leaving the outer portion of the wing, (where the ailerons are) still flying. An elliptical wing however, will tend to stall uniformly all along the span creating a potentially dangerous situation for the pilot. Finally, other factors dictate a wings ideal shape more than the desire to reduce induced drag. The tapered wing, for instance, is lighter and easier to build, factors which outweigh the advantages of an elliptical wing's ability to reduce induced drag.

Another popular method of reducing induced drag is to design a wing with washout, also referred to herein as twist or wing twist. Washout may be applied to wings so that the outboard section of the wing does not stall first. When an aircraft may be increasing its angle of attack, i.e. increasing the lift of the wing, the airflow over the wing eventually reaches a point where it becomes turbulent, causing a loss in lift. By twisting the front outboard portion of the wing down, the induced drag in that area may be decreased and the stall may be delayed in that area. By maintaining lift on the outboard portion of the wing, the pilot may be still able to maintain roll control of the aircraft in the event of a stall on other portions of the wing.

Conventionally, washout may be incorporated into a wing using geometric twist and aerodynamic twist. The use of washout in the prior art, however, may be characterized by two major shortcomings. First, since the amount of twist may be integrated into a wing at the time of construction, usually for a design lift coefficient, the twist in a wing may only be optimized, if at all, for one portion of the expected flight envelope. Second, washout comes at a price. A wing with washout experiences a decrease in lift performance due to the reduction in the angle of attack.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1A:
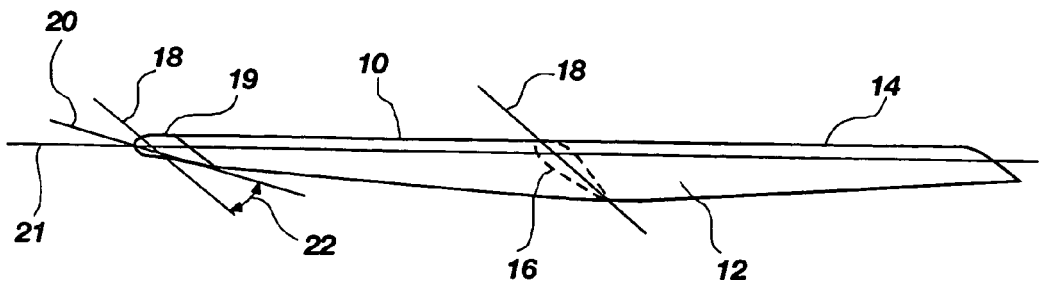
FIG. 1A is a perspective view of an aircraft wing.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

The following publications are hereby incorporated by reference herein in their entireties: W. F. Phillips, *Lifting-Line Analysis for Twisted Wings and Washout Optimized Wings*, Journal of Aircraft, Vol. 41, No. 1, January–February 2004, pages 128–136; W. F. Phillips, N. R. Alley, and W. D. Goodrich, *Lifting-Line Analysis of Roll Control and Variable Twist*, presented as Paper 2003-4061 at the 21$^{st}$ AIAA Applied Aerodynamics Conference, Orlando, Fla., 23–26 Jun. 2003; Anderson, J. D., *Fundamentals of Aerodynamics*, 3rd ed., McGraw-Hill, New York, 2001; Bertin, J. J., *Aerodynamics for Engineers*, 4th ed., Prentice-Hall, Upper Saddle River, N.J., 2002; Karamcheti, K., *Ideal-Fluid Aerodynamics*, Wiley, New York, 1966; Katz, J., and Plotkin, A., *Low-speed Aerodynamics*, 2nd ed., Cambridge University Press, Cambridge, UK, 2001; Kuethe, A. M., and Chow, C. Y., *Foundations of Aerodynamics*, 5th ed., Wiley, New York, 1998; McCormick, B. W., Aerodynamics, *Aeronautics, and Flight Mechanics*, 2nd ed. Wiley, New York, 1995; and Phillips, W. F., *Mechanics of Flight*, Wiley, New York, 2004.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein the term "geometric twist" means a variation in the local geometric angle of attack. Geometric twist may be the rotation of the outboard airfoil sections of a wing relative to the root airfoil section.

As used herein the term "aerodynamic twist" means a variation in the local zero-lift angle of attack. Aerodynamic twist may be the bending of the outboard airfoil sections of a wing relative to the root airfoil section.

As used herein, the terms "washout," "twist," and "wing twist" mean geometric and/or aerodynamic twist, either separately or in combination, for reasons that are explained further below. To avoid repeated use of the lengthy and cumbersome phrase "geometric and aerodynamic twist," the words "washout," "twist," and "wing twist" will be used synonymously to indicate a full or partial spanwise variation in either the local geometric angle of attack (geometric twist) or the local zero-lift angle of attack (aerodynamic twist). Thus, the terms "washout," "twist," and "wing twist" may be used interchangeably and refer to both aerodynamic twist or geometric twist, except if otherwise specified.

As used herein, the term "optimum twist distribution" means a non-dimensional wing twist distribution that can be applied to a wing such that the wing has the induced drag at the same minimum level as an elliptic wing having the same aspect ratio and no washout.

As used herein, the term "optimum twist amount" means the amount of twist calculated from the lift coefficient to be applied, either geometrically or aerodynamically, pursuant to the optimum twist distribution. Optimum twist amount may depend on, among other things, one, some or all of the parameters defining the lift coefficient. Typically, the optimum twist amount changes during flight in correlation to changes in the lift coefficient.

As used herein, the term "optimum twist" for a wing means an optimum twist amount applied in the optimum twist distribution using geometric or aerodynamic twist, either separately or in combination. Typically, the optimum twist will vary during a flight pursuant to variations in the optimum twist amount. The optimum twist may be applied wholly or partially to any wing to improve the amount of reduced drag.

As used herein, the term "planform" means the shape and layout of an airplane's wing as is known by those skilled in the art. While the wing planform is usually, but not necessarily, fixed for any particular airplane, it should be noted that the present disclosure may be used with most any planform.

As used herein, the term "wingspan" refers to the total span of the wing measured from wingtip to wingtip.

Table 1, below, comprises a list of nomenclature used by the applicant in the present disclosure.

TABLE 1

| | |
|---|---|
| $b =$ | wingspan |
| $b/2 =$ | semi-wingspan |
| $C_L =$ | lift coefficient |
| $\tilde{C}_{L,a} =$ | airfoil section lift slope |
| $C_{L,a} =$ | wing lift slope |
| $c =$ | local chord length |
| $c_f =$ | local flap chord length |
| $c_{Tip} =$ | tip chord length |
| $c_{Root} =$ | root chord length |
| $n =$ | load factor |
| $R_T =$ | wing taper ratio |
| $R_A =$ | wing aspect ratio, $b^2/S$ |

TABLE 1-continued

| | |
|---|---|
| $S =$ | wing planform area |
| $V =$ | airplane airspeed |
| $W =$ | airplane weight |
| $\delta_t =$ | total or maximum flap twist angle, washout positive |
| $\epsilon_f =$ | local airfoil section flap effectiveness |
| $\theta =$ | change of variables for the spanwise coordinate |
| $\rho =$ | air density |
| $\Omega_{OPT} =$ | optimum total symmetric twist angle, geometric plus aerodynamic, washout positive |
| $\omega =$ | spanwise symmetric twist distribution function |
| $z =$ | spanwise distance from root section |
| $\kappa_{D\Omega} =$ | washout contribution to the induced drag factor |
| $\kappa_{DL} =$ | lift washout contribution to induced drag factor |

Applicant has discovered that induced drag can be minimized for a wing, if wing twist may be related to an optimum twist distribution and an optimum twist amount. The word "wing," as used herein, shall refer broadly to any lift-inducing structure that engages fluid flow to help provide lift or buoyancy, with the understanding that the term "fluid" refers to both gases and liquids. Such lift-inducing structure may be a part of an aircraft such as an airfoil, or a part of a watercraft such as a rudder, or a part of any other vehicle that utilizes lift or buoyancy to operate. Applicant has further discovered that induced drag can be minimized over a range of operating conditions encountered during flight by continuously optimizing the twist of a wing based upon the operating conditions and an optimum twist distribution. The optimized twist for a wing may be continuously updated by varying the geometric twist or aerodynamic twist, either separately or in combination, during a flight. Thus, the wing may be maintained at an optimum twist during flight for the entire flight envelope.

This is an improvement over integrating the twist permanently into a wing at the time of manufacture as previously done for a specific design lift coefficient. Instead, the wing may be optimized for a wide range of lift coefficients. Other benefits to optimizing the twist of a wing may include reduction in the pitching moment produced by the wing, which can improve trim requirements and maneuverability, as well as alternation of the downwash induced on an aft tail by the main wing, which can reduce drag and improve trim requirements and maneuverability.

FIGS. 1A–1F are illustrative of the prior art as well as of principles needed by an uninitiated reader to understand the present disclosure. It should be noted that FIGS. 1A–1F should not be construed as limiting in any way on the present disclosure, but instead should be referred to as general background to the present disclosure.

Referring now to FIG. 1A, there is shown an example of a wing 10 having a fixed geometric twist. Wing 10 comprises a leading edge 14 and a trailing edge 12. Geometric twist, also referred to as geometric washout, can be measured by angle 22 formed by the intersection of the root chord line 18 of the root section 16 (shown with dashed lines) with the tip chord line 20 of the tip section 19. The chord of an airfoil is the imaginary straight line drawn through the wing 10 from its leading edge 14 to its trailing edge 12.

As can be observed, the geometric twist lessens the local geometric angle of attack into the relative wind thereby decreasing the amount of lift in that local area. In other words, the tip section 19 may have a lower angle of attack than the root section 16 to delay stall at the tip section 19. The wing 10 may be twisted around the quarter chord line 21 or fixed point. The twist incorporated into wing 10 may be fixed and cannot be varied in distribution or amount.

Figure 1B:
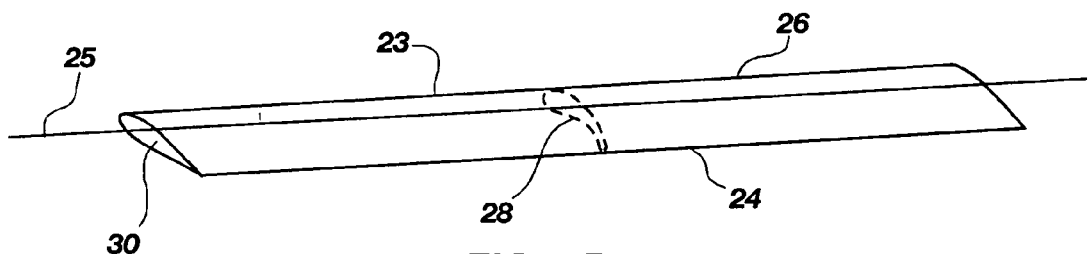
FIG. 1B is a perspective view an alternative embodiment of an aircraft wing.

Aerodynamic twist, also referred to as aerodynamic washout, is illustrated in FIG. 1B on wing 23 having a leading edge 26 and a trailing edge 28. For aerodynamic twist, the tip section 30 has a different camber than the root section 28. In other words, the tip section 30 has a different cross-sectional shape than the root section 28. In practice, aerodynamic twist varies the local zero-lift angle of attack to delay stalling in at the tip section 30. This is primarily due to the fact that the tip section 30 will produce less lift than the root section 28. In wing 23, the aerodynamic twist, the change in camber, may be fixed into the wing at the time of manufacture and cannot be varied. It is to be understood that a change of camber can be physically accomplished in accordance with structures and methods for changing camber known to those having ordinary skill in the relevant field pertaining to changes in camber.

Figure 1C:
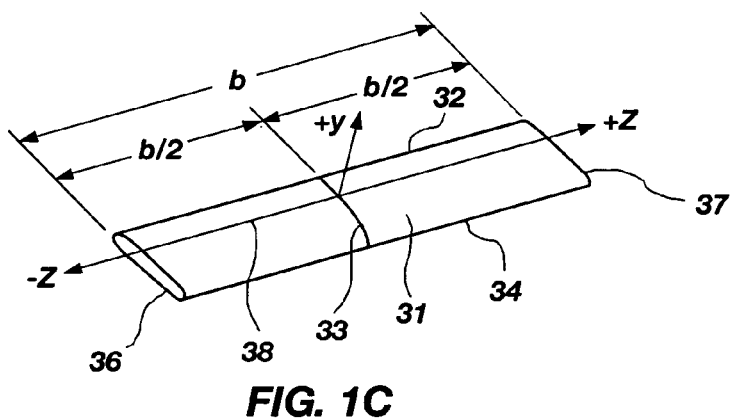
FIG. 1C is a perspective view of an aircraft wing showing a coordinate system.
Figure 1D:
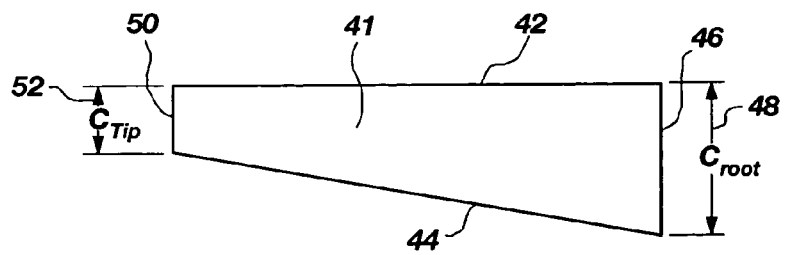
FIG. 1D is a plan view of a further embodiment of an aircraft wing.
Figure 1E:
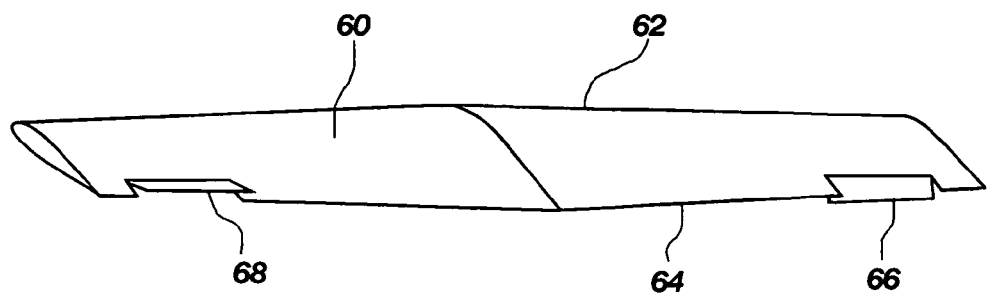
FIG. 1E is a perspective view an additional alternative embodiment of an aircraft wing.
Figure 1F:
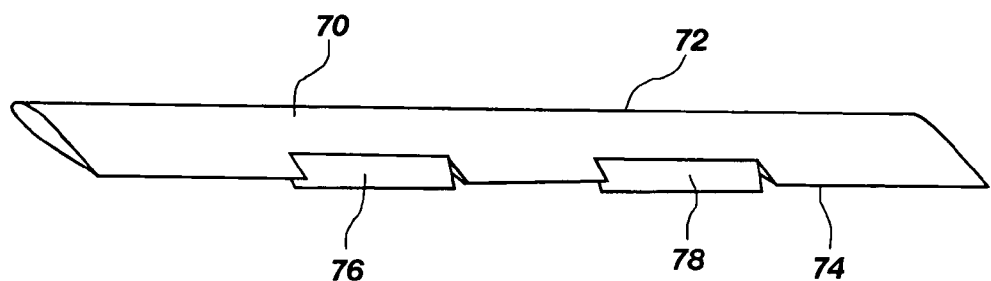
FIG. 1F is a perspective view another alternative embodiment of an aircraft wing.

Aerodynamic twist is also illustrated in FIGS. 1E and 1F for a typical wing by means of a deflection of a control surface as is known in the prior art as a flap deflection. Wing 60 having a leading edge 62 and trailing edge 64 in FIG. 1E illustrates a local zero-lift angle of attack variation as a result of asymmetric deflection of ailerons 66 and 68. Wing 70 having a leading edge 72 and trailing edge 74 in FIG. 1F illustrates a variation in the local zero-lift angle of attack variation as flaps 76 and 78. Significantly, it will be noted from both FIGS. 1E and 1F that the aerodynamic twist from the deflection may be constant both in amount and distribution across the control surfaces, i.e. ailerons 68 and 66 and flaps 76 and 78. It should also be noted that this holds true for a wing with both flaps and ailerons. Simply understood, the deflection in the control surfaces changes the cross sectional shape of a wing thereby resulting in the aerodynamic twist. Pure geometric twist on the other hand, does not change the cross sectional shape but instead rotates the entire section around a fixed point.

As mentioned previously, wing twist can be accomplished by geometric twist and/or aerodynamic twist, either separately or in combination to obtain the same washout. The amount of flap deflection or camber-line deformation that may be equivalent to a given amount of geometric twist can be determined from any of several well-known methods, which are commonly used in the field of aerodynamics. These include but are not limited to classical thin airfoil theory, conformal mapping of potential flow solutions using complex variables, vortex panel codes, and with or without boundary layer corrections. These methods are discussed and explained in widely available aeronautical engineering textbooks and will not be discussed further here.

Coordinate system 38 shown on wing 31 in FIG. 1C represents one commonly used by those skilled in the art. The coordinate system 38 may be centered on the root 33, between the leading edge 32 and the trailing edge 34. The y-axis extends in the vertical direction and the z-axis extends in the horizontal or spanwise direction, i.e. towards the wing tips, 36 and 37. The span of the entire wing is b, while each semi-wing is b/2 as can be readily ascertained from FIG. 1c.

Referring now to FIG. 1D, there is shown a tapered wing 41 having a leading edge 42 and a trailing edge 44. Wing taper ratio, $R_T$, is defined by $c_{Tip}/c_{Root}$ where $c_{Tip}$ is the length of the tip chord 50, represented by the double arrow marked with reference numeral 52, and $c_{Root}$ is the length of the root chord 46, represented by the double arrow marked with the reference numeral 48. The function c(z) means the length of a chord at any point z along the span of wing 41.

Figure 1G:
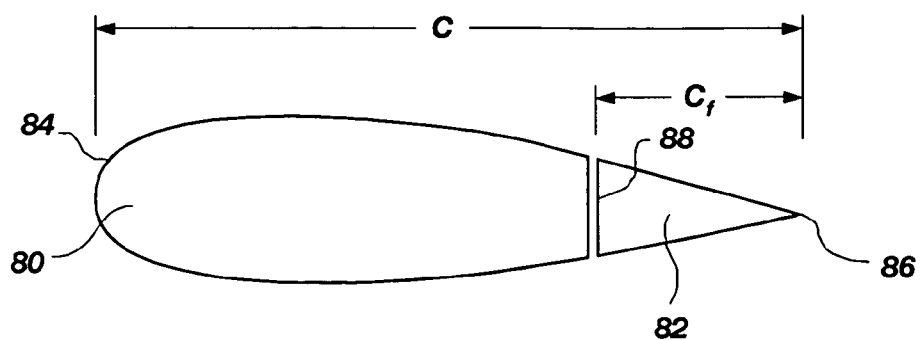
FIG. 1G is an end view of an aircraft wing.

FIG. 1G illustrates how to determine flap ratio, $c_f/c$, for a wing 80 having a flap 82. The local chord length c is measured from the leading edge 84 to the trailing edge 86. The local flap chord length $c_f$ is measured from the front edge of the flap to the trailing edge 86. It should be recognized that for the special case where the entire wing can act a flap, then the flap ratio is one (1).

Figure 1H:
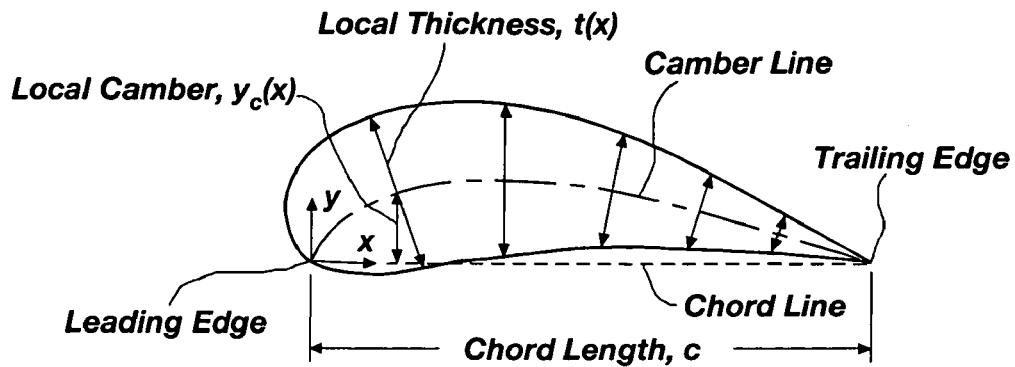
FIG. 1H is an exaggerated, out of proportion illustration of an airfoil cross section.

Referring now to FIG. 1H, an airfoil is any two dimensional cross-section of a wing or other lifting surface that lies in a plane perpendicular to the spanwise coordinate. An airfoil section is completely defined by the geometric shape of its boundary. However, the aerodynamic properties of an airfoil section are most profoundly affected by the shape of its centerline. This centerline is midway between the upper and lower surfaces of the airfoil and is called the camber line. If the airfoil is not symmetric, the camber line is not a straight line but rather a planar curve.

Because the shape of the camber line is such an important factor in airfoil design, it is critical that it be understood exactly how the camber line is defined. The following nomenclature is as it applies to airfoil geometry such as that shown in FIG. 1H.

The "camber line" is the locus of points midway between the upper and lower surfaces of an airfoil section as measured perpendicular to the camber line itself.

The "leading edge" is the most forward point on the camber line. The leading edge cannot readily be seen or identified by inspection with an unaided human eye in airfoil drawings that are to scale, and as such, FIG. 1H is shown as an exaggerated, out of proportion illustration.

The "trailing edge" is the most rearward point on the camber line.

The "chord line" is a straight line connecting the leading edge and the trailing edge.

The "chord length," often referred to simply as the "chord," is the distance between the leading edge and the trailing edge as measured along the chord line.

The "maximum camber," often referred to simply as the "camber," is the maximum distance between the chord line and the camber line as measured perpendicular to the chord line.

The "local thickness," at any point along the chord line, is the distance between the upper and lower surfaces as measured perpendicular to the camber line.

The "maximum thickness," often referred to simply as the "thickness," is the maximum distance between the upper and lower surfaces as measured perpendicular to the camber line.

The "upper and lower surface coordinates" for an airfoil can be obtained explicitly from the camber line geometry, $Y_c(x)$, and the thickness distribution t(x), in which:

$$x_u(x) = x - \frac{t(x)}{2\sqrt{1+(dy_c/dx)^2}} \frac{dy_c}{dx}$$

$$y_u(x) = y_c(x) + \frac{t(x)}{2\sqrt{1+(dy_c/dx)^2}} \frac{dy_c}{dx}$$

$$x_l(x) = x + \frac{t(x)}{2\sqrt{1+(dy_c/dx)^2}} \frac{dy_c}{dx}$$

$$y_l(x) = y_c(x) - \frac{t(x)}{2\sqrt{1+(dy_c/dx)^2}} \frac{dy_c}{dx}$$

With these basic principles in mind, we can now turn to the present disclosure.

As mentioned above, an elliptic wing without any washout generates the minimum induced drag of any known wing planform for any aspect ratio and any lift coefficient.

In general, the optimum twist distribution for a given wing planform may be computed from $$\omega(z) = 1 - \frac{\sqrt{1-(2z/b)^2}}{c(z)/c_{root}} \quad \text{or}$$

$$\omega(\theta) = 1 - \frac{\sin(\theta)}{c(\theta)/c_{root}} \quad \text{where}$$

$$\theta = \cos^{-1}(-2z/b)$$

then the induced drag generated by a non-elliptic wing may be minimized to that of an elliptic wing. For the special case of a tapered wing, the optimum twist distribution function may be simplified to:

$$\omega(z) = 1 - \frac{\sqrt{1-(2z/b)^2}}{1-(1-R_T)|2z/b|}$$

Figure 2:
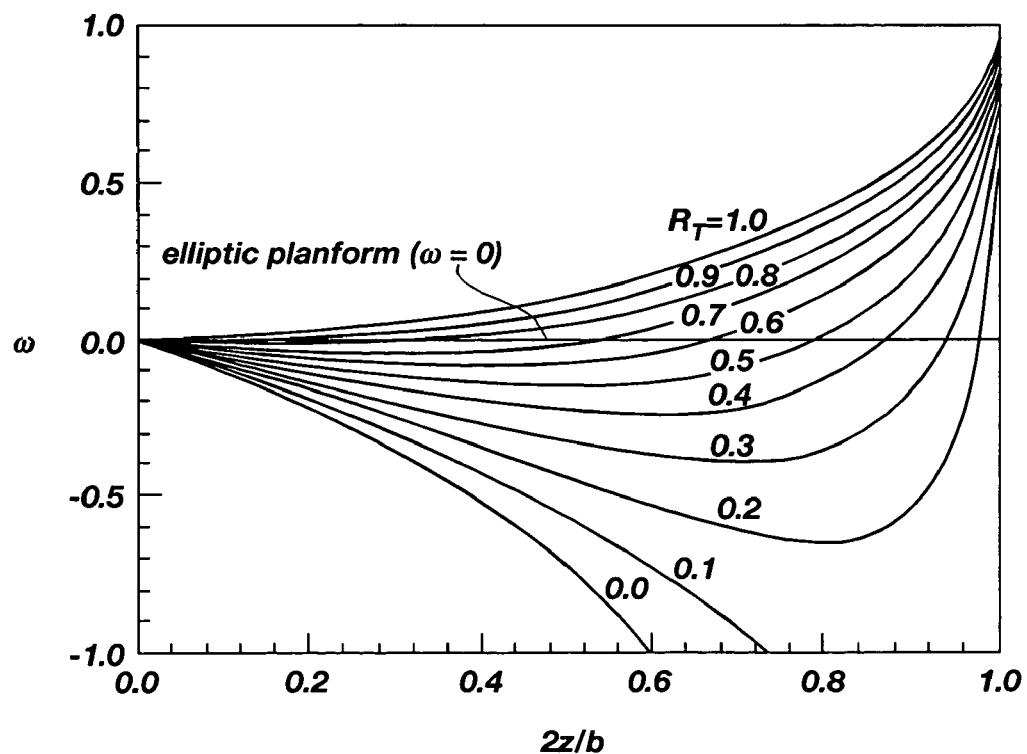
FIG. 2 is a chart depicting twist distributions.

The optimized washout distribution according to the above equation(s) is shown in the graph illustrated in FIG. 2 for several values of taper ratio, $R_T$, between 0 and 1. For each of the taper ratios, $R_T$, a different distribution may be required. It should be noted that the optimized twist distribution shown in FIG. 2 is normalized and non-dimensional and therefore can be applied to a wing of any given length and for any given twist amount by simple scalar multiplication. As might be expected, the optimized twist distribution for an elliptic planform is zero (0).

In general, the optimized twist amount may be determined from $$(\delta_t)_{opt} = \frac{\kappa_{DL} C_L}{2\kappa_{D\Omega} C_{L,\alpha} \varepsilon_f} \quad \text{where}$$

$$\kappa_{D\Omega} \equiv \left(\frac{b_1}{a_1}\right)^2 \sum_{n=2}^{\infty} n\left(\frac{b_n}{b_1} - \frac{a_n}{a_1}\right)^2$$

$$\kappa_{DL} \equiv 2\frac{b_1}{a_1} \sum_{n=2}^{\infty} n\frac{a_n}{a_1}\left(\frac{b_n}{b_1} - \frac{a_n}{a_1}\right)$$

$$C_{L,\alpha} = \pi R_A a_1$$

the coefficients $a_n$ and $b_n$ being computed from $$\sum_{n=1}^{\infty} a_n \left[\frac{4b}{\tilde{C}_{L,\alpha} c(\theta)} + \frac{n}{\sin(\theta)}\right] \sin(n\theta) = 1$$

$$\sum_{n=1}^{\infty} b_n \left[\frac{4b}{\tilde{C}_{L,\alpha} c(\theta)} + \frac{n}{\sin(\theta)}\right] \sin(n\theta) = \omega(\theta)$$

The solution $a_n$ is commonly referred to as the Fourier series solution to Prandtl's classical lifting-line equation. The only unknowns in that equation are the Fourier coefficients, $a_n$. Historically, these coefficients have usually been evaluated from collocation methods. Typically, the series may be truncated to a finite number of terms and the coefficients in the finite series are evaluated by equation to be satisfied at a number of spanwise locations equal to the number of terms in the series.

Other methods of solution have also been developed and are discussed and explained in widely available aeronautical engineering textbooks. Any of the methods commonly used to obtain a solution to $a_n$ can be used to obtain the Fourier coefficients, $b_n$. While the solutions for $a_n$ have been known since the mid 1920s, the optimized equations for twist distribution and twist amount were recently developed by applicant, albeit in the context of a fixed twist distribution. These equations can be used to obtain the optimum geometric twist and/or the optimum aerodynamic twist, which could be implemented by either method or a combination of both.

For the special case of a tapered or rectangular wing, when the present disclosure may be put into practice using either geometric twist or aerodynamic twist, the optimum twist amount formula given above can be greatly simplified. For the special case of a tapered or rectangular wing having full span flaps of constant effectiveness, the optimum total amount of twist may be computed from:

$$(\delta_t)_{opt} = \frac{2(1+R_T)C_L}{\pi \tilde{C}_{L,\alpha} \varepsilon_f}$$

where $R_T$ is the taper ratio, $C_L$ is the lift coefficient, $\varepsilon_f$ is the local airfoil section flap effectiveness, and $\tilde{C}_{L,\alpha}$ is equal to the airfoil section lift slope.

It should be noted that the airfoil section lift slope may be typically given a value of $2\pi$ with good results. However, it should be understood that other values of the airfoil section lift slope may be used. This may include actual values resulting from actual test results, computer simulation, known equations or yet to be known equations. It should be understood that the value of the airfoil section lift slope may only be an approximation of the true value.

$\varepsilon_f$, the local airfoil section flap effectiveness, may likewise be determined from actual test results, computer simulation, known equations or yet to be known equations. One such presently known equation may be $$\varepsilon_f = 1 - \frac{\theta_f - \sin\theta_f}{\pi} \quad \text{where}$$

$$\theta_f = \cos^{-1}(2c_f/c)$$

and where $c_f$ is the chord length of the flap and c is the entire chord length (see FIG. 1G). For the special case where the entire wing twists, e is equal to one (1) thereby reducing the equation to $$\Omega_{opt} = \frac{2(1+R_T)C_L}{\pi \tilde{C}_{L,\alpha}}$$

The wing lift coefficient, $C_L$, can vary widely over the allowable flight envelope. For this reason, it is advantageous to be able to vary wing twist interactively during flight in direct response to the lift coefficient or any of its individual parameters, either separately or in combination. The lift coefficient may be defined as $$C_L = \frac{Wn}{\frac{1}{2}\rho V^2 S_w}$$

where W is the aircraft weight, n is load factor or "g-factor" associated with the normal acceleration of the airplane during a maneuver, ρ is the air density, V is the airspeed, and $S_W$ is the wing area. These parameters may be referred to individually or collectively as operating conditions.

It should be noted that any mechanism used to interactively vary wing twist (geometric or aerodynamic) as a function of the parameters that affect the lift coefficient fall within the scope of the present disclosure. Each of the individual parameters of the lift coefficient will be described in more detail below.

The airplane's weight, W, which varies during flight as a result of fuel burn and other factors such as the dropping of a payload, accessories, or armament. The instantaneous aircraft weight can be determined from fuel gauges and other sensors available to a flight computer. The wing twist would then be interactively varied as a function of airplane weight as determined from such sensors.

The load factor, n, which varies during flight whenever the airplane is being maneuvered. This may be particularly important for fighter aircraft which are designed to perform very rapid maneuvers, which can produce load factors as large as 9 or 10 g. The instantaneous load factor can be determined from accelerometers and other sensors available to a flight computer. The wing twist would then be interactively varied as a function of airplane load factor as determined from such sensors.

The air density, ρ, which varies during flight as a result of changes in altitude, barometric pressure, and temperature. The instantaneous air density can be determined from altimeters, pressure gauges, temperature gauges, and other sensors available to a flight computer. The wing twist would then be interactively varied as a function of the air density as determined from such sensors.

The airplane's airspeed, V, which varies considerably between takeoff or landing speeds and cruise or maximum flight speed. The instantaneous airspeed can be determined from an airspeed indicator or other such sensor available to a flight computer. The wing twist would then be interactively varied as a function of airspeed as determined from such sensors.

The airplane's wing area, S, which may be typically fixed during flight. However, some airplanes do have variable wing geometry. In such aircraft, wing twist could also be interactively varied as a function of wing area.

Figure 3:
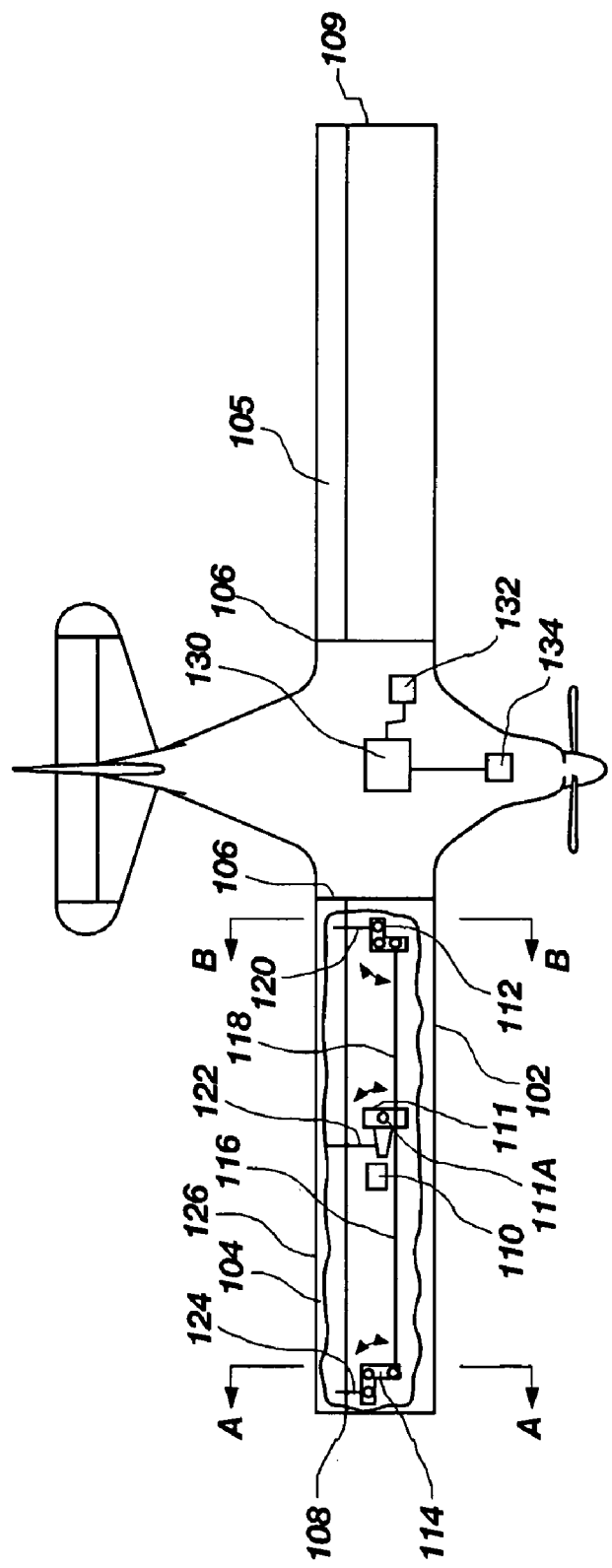
FIG. 3 is a plan view of an aircraft with part of a wing broken away to depict a control surface twisting mechanism.

FIG. 3 illustrates airplane 100 having employed onto its wing 102 one exemplary embodiment of the present disclosure. Each semi-wing has a full span deflecting control surface, 104 and 105, extending from about the root 106 to about the wing tips, 108 and 109, respectively. The control surfaces 104 and 105 on the wing may be used to simultaneously provide roll control, high-lift and minimum induced drag. The right semi-wing shows a break away view of an interior portion of the semi-wing.

Motor 110, such as a servo, hydraulic pump, or other drive means may be connected to arm 111. Motor 110 may rotate arm 111 in response to control signals from on board computer. Rod 122 may be connected to arm 111 attached to the wing 102 at a pivot point, 111A, can be pushed or pulled as the arm 111 may be rotated around the pivot point 111A, to deflect a portion of control surface 104. Linkages 116 and 118 couple arm 111 with arms 114 and 112, respectively. As arm 111 rotates, arms 114 and 112 also rotate around their respective pivot points (not indicated) to push or pull respective rods 124 and 120 to deflect respective portions of the control surface. It will be appreciated that a twist distribution, such as the optimum twist distribution, may be integrated into the design such that the control surface 104 deflection always comports to the twist distribution.

It will be appreciated that the greater the rotation of the motor 110, the more twist amount may be imparted to the control surface 104—which always has the same twist distribution. It will be further appreciated that while only three push/pull rods are shown, many more can be used to more closely approximate the twist distribution being sought.

On-board computer 130 may calculate a twist amount, such as the optimum twist amount, based on operating conditions and send corresponding control signals to motor 110. On-board computer 130 may receive data from sensors 132 or gauges 134. The data may include one, some or all of the parameters needed to calculate the lift coefficient. The on-board computer 130 may continuously receive data and continuously send control signals to motor 110 such the induced drag may be minimized through changing the twist distribution on the control surface 104 and 105. The on-board computer 130 may sample the data at a predetermined rate. The control surfaces 104 and 105 may also be varied to input from the pilot received through the flight controls to control the airplane 100 in a conventional manner.

Figure 4:
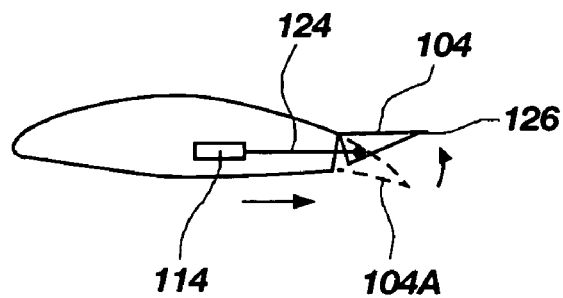
FIG. 4 is a cross-sectional view of the wing of FIG. 3 taken along line A—A.
Figure 5:
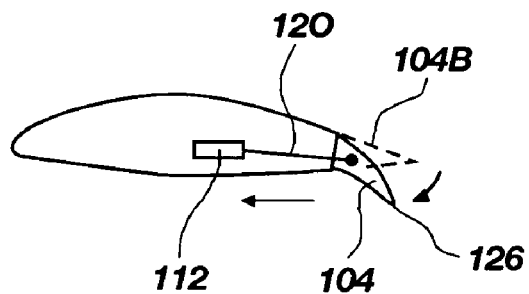
FIG. 5 is a cross-sectional view of the wing of FIG. 3 taken along line B—B.

FIGS. 4 and 5 illustrate how each of the rods 120, 122 and 124 "twists" the control surface 104. FIG. 4, taken along plane A—A in FIG. 3, shows that when rod 124 may be "pushed" by arm 114 with the appropriate rotation, the control surface 104 may be pushed up at that point compared to untwisted control surface 104A shown by the dashed lines. FIG. 5, taken along plane B—B of FIG. 3, shows that when rod 120 may be "pulled" by arm 112 with the appropriate rotation, the control surface 104 may be pulled downwards at that point compared to untwisted control surface 104B shown by the dashed lines. The combination of the various rods 124, 122 and 120 may be used to form a twist distribution along control surface 104 by similar pushing and pulling. Thus, the control surface 104 and 105 must be somewhat flexible such that they can be twisted pursuant to a twist distribution.

Figure 6:
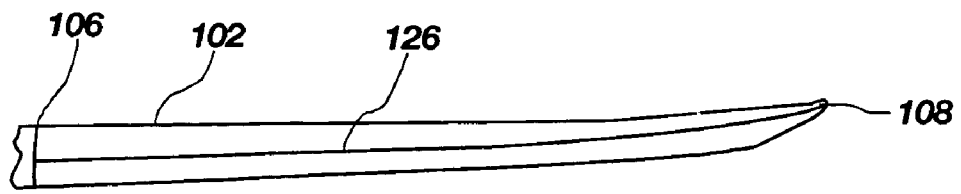
FIG. 6 is a rear view of a semi-wing of FIG. 3, illustrating one twist distribution of a spanwise control surface.

FIG. 6 is a rear view of the right semi-wing of wing 102 showing the trailing edge 126 twisted in accordance with a twist distribution. As can be observed, the control surface 104 has been deflected such that the trailing edge 126 may be distributed pursuant to a twist distribution from the root 106 to the tip 108. The trailing edge 106, the rearmost portion of control surface 104, may be noticeable higher at near the tip 108 as dictated by the optimum twist distribution formula and the corresponding graph in FIG. 2.

The wing twist defined by the equations outlined herein, can be used to maintain minimum induced drag over a range of operating conditions in plane 100 by employing full-span control surfaces 104 that can be twisted along their length to produce a continuous spanwise variation in zero-lift angle of attack (aerodynamic twist). For a rectangular wing as wing 102, little twist may be required in the region near the root 106. Thus, the geometry shown in FIG. 7 can be used to approximate the aerodynamic twist needed to minimize induced drag. It is important to note that in practice, it may be difficult to obtain an optimum twist distribution in a wing due to mechanical limitations. These limitations may include weight, material, space and other design considerations. Thus, it is not a requirement of the present disclosure that a perfect optimum twist distribution be applied to a wing, but that the distribution may be approximated as much as possible is sufficient to fall within the scope of the present disclosure as claimed.

Figure 7:
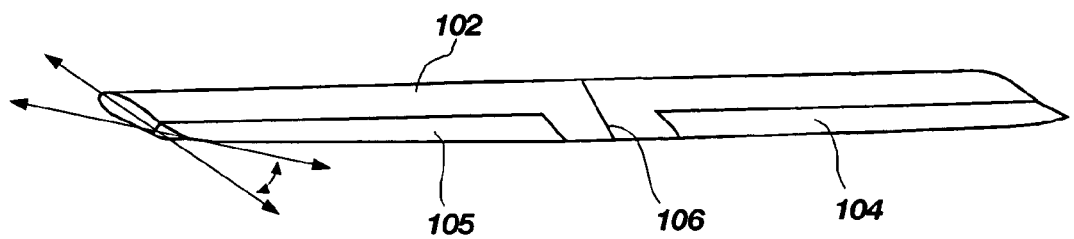
FIG. 7 is a perspective view of an exemplary embodiment of a wing having a control flap that has a washout to reduce induced drag, with no flap deflection.
Figure 8:
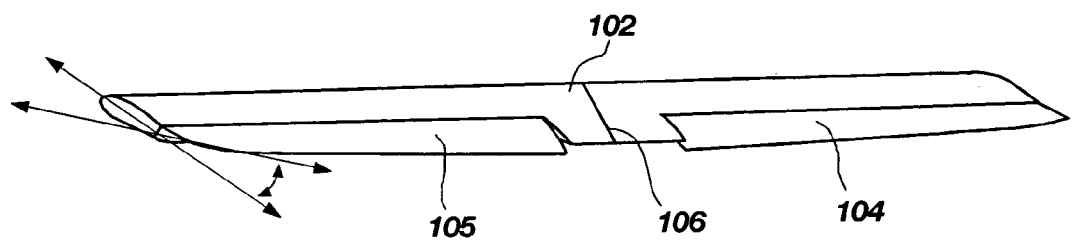
FIG. 8 is a perspective view of the wing of FIG. 7 in which the control flap has a 15 degree deflection and a washout to reduce induced drag.

By way of example, suppose the rectangular wing 102 shown in FIG. 3 has an aspect ratio of 6.0 with 30 percent trailing-edge flaps that provide a section flap effectiveness of 0.60. For an airfoil section lift slope of $2\pi$ and a lift coefficient of 0.60, the equations derived by applicant as well as the other equations disclosed herein require a spanwise elliptic washout distribution with 7.0 degrees of total washout at the wingtips. Since the section flap effectiveness is 0.60, this requires 11.6 degrees of elliptic flap twist, which is shown in FIG. 7. Similarly, a lift coefficient of 1.40 requires 27.1 degrees of elliptic flap twist, which is shown in FIG. 8 in combination with 15 degrees flap deflection. Thus, control surfaces 104 and 105 can be used to control roll, high-lift and to minimize induced drag.

It will be appreciated that it is not necessary for the twist distribution to be applied along the entire wing. For example, it is not necessary that the control surfaces 104 and 105 extend along the entire wingspan but may stop short of the fuselage of the airplane 100. Improved induced drag can be accomplished by varying the twist of only a portion of the wing during a flight in accordance with the optimum twist distribution shown in FIG. 2. Again, limitations such as weight, material, space and other design considerations may take precedence.

Figure 9:
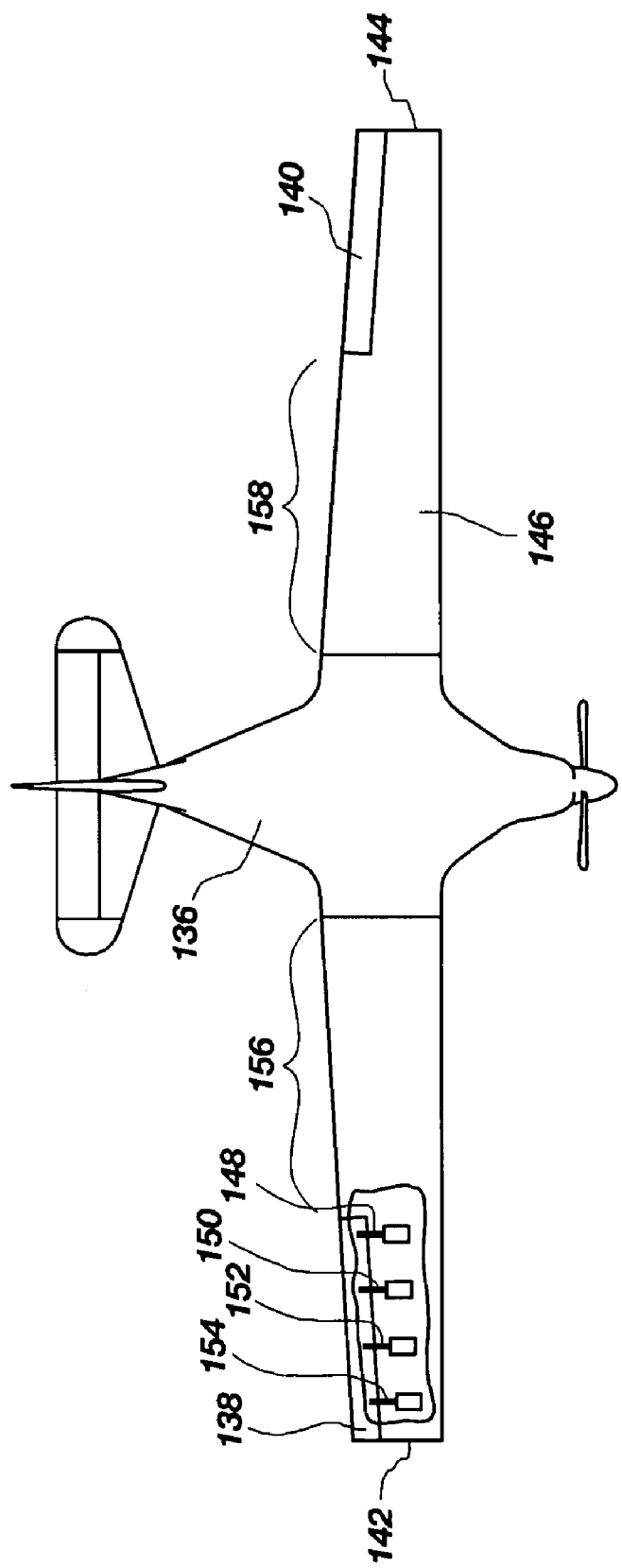
FIG. 9 is a plan view of an aircraft with part of a wing broken away to depict a control surface twisting mechanism.
Figure 10:
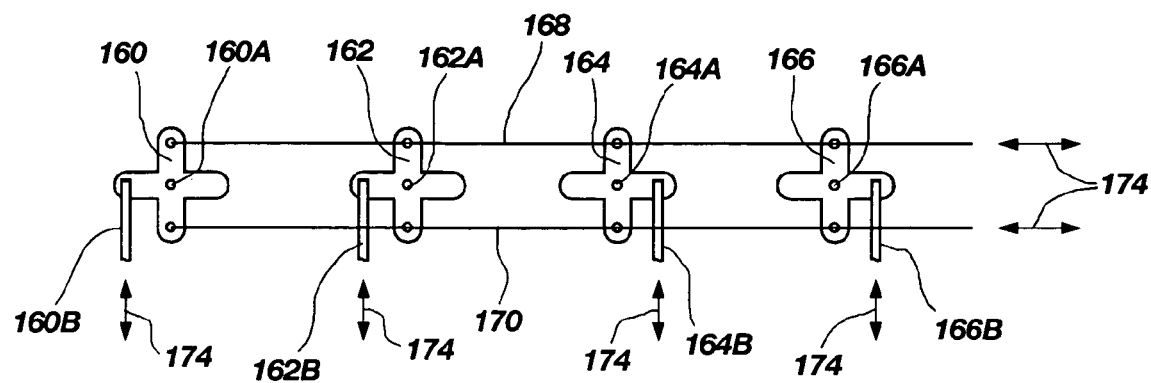
FIG. 10 is a break-away schematic view of one embodiment of a mechanism for twisting a control surface using two control cords and push/pull arms.

A plane 136 having control surfaces 138 and 140, such as ailerons, located near the respective tips 142 and 144 of a tapered wing 146 is shown in FIG. 9. The right semi-wing has a breakaway portion exposing the part of the interior of wing 146. Rods 148, 150, 152, and 154 may be used to impart twist to control surface 138 in accordance with a twist distribution. Similar rods (not shown) may twist control surface 140 accordingly. Portions 156 and 158 of wing 146 may not be twisted at all during flight. Improved induced drag will still be obtained for such a configuration as shown in FIG. 9. This may be partly due to the fact that for many wing taper ratios shown in the graph in FIG. 2, it can be observed that near the root section of the wing, the twist distribution may be minimal while at the tips the twist distribution may be much greater. Thus, twisting only a portion of a wing in accordance with the optimal twist distribution is within the scope of the present disclosure. The same holds true for a wing having multiple control surfaces, such as flaps and ailerons, on each semi-wing.

FIGS. 10–15 each illustrate an additional method of implementing the push/pull rods to impart a twist distribution in a wing, examples of which were discussed in relation to FIGS. 3–9. Four cogwheels 160, 162, 164, and 166 rotate around pivot points 160A, 162A, 164A, and 166A, respectively. Control linkages 168 and 170 may be used to provide a torque to rotate cogwheels 160, 162, 164, and 166 in either direction as indicated by double arrows 172. Rods 160B, 162B, 164B, and 166B push or pull in the direction as shown by the double arrows marked with reference numeral 174 depending upon the direction in which the control linkages 168 and 170 are moved as well as which side of the respective pivot points (160A, 162A, 164A, and 166A) the rods 160B, 162B, 164B, and 166B are connected.

Figure 11:
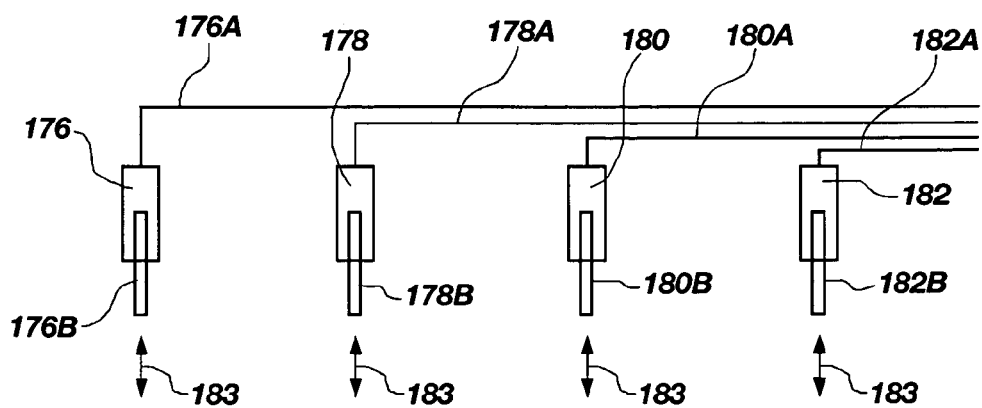
FIG. 11 is a break-away schematic view of a further embodiment of a mechanism for twisting a control surface using hydraulic push/pull rods.

A hydraulic system as shown in FIG. 11 may also be used. Hydraulic lines 176A, 178A, 180A and 182A, connected to hydraulic cylinders, 176, 178, 180 and 182, respectively, and a pump (not shown), may be used to independently push or pull rods 176B, 178B, 180B and 182B to vary wing twist in the directions as shown by the double arrows marked with reference numeral 183.

Figure 12:
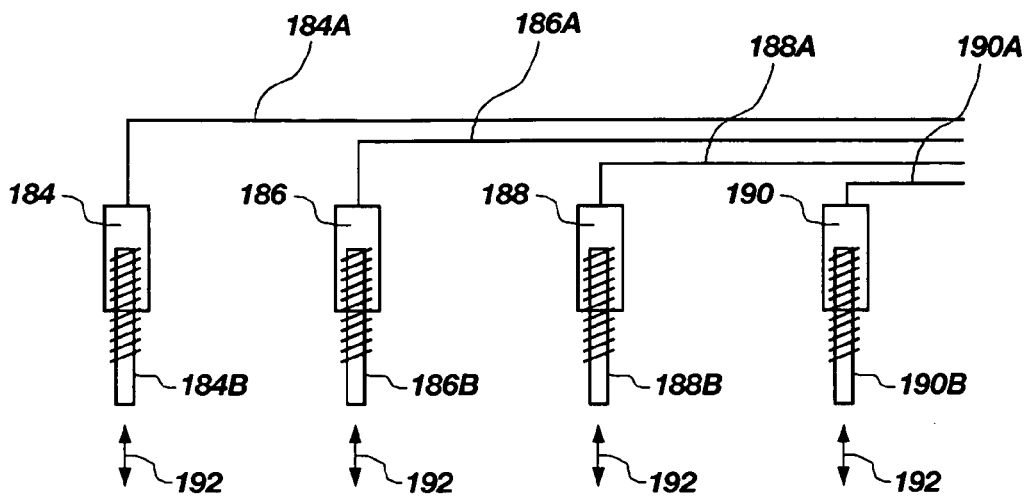
FIG. 12 is a break-away schematic view of an additional embodiment of a mechanism for twisting a control surface using threaded engagement.

FIG. 12 illustrates the use of control wires 184A, 186A, 188A and 190A to push or pull rods 184B, 186B, 188B, and 190B, each of the rods 184B, 186B, 188B, and 190B having a threaded end. Actuators 184, 186, 188, and 190 push or pull the respective rods 184B, 186B, 188B, and 190B in the direction indicated by double arrows 192 by engaging the threaded ends in accordance with signals received from the respective control wires 184A, 186A, 188A and 190A.

Figure 13:
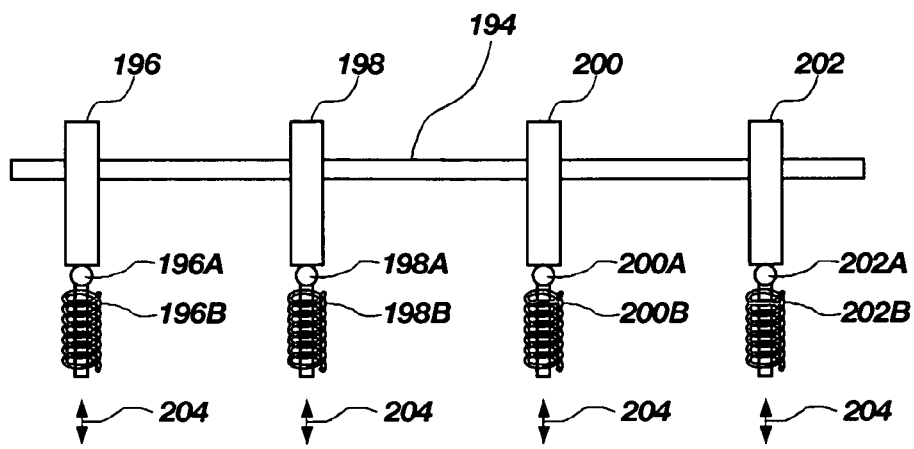
FIG. 13 is a break-away schematic view of a further embodiment of a mechanism for twisting a control surface using a rotating shaft.
Figure 14:
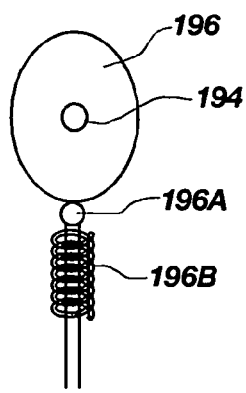
FIG. 14 is a break-away schematic end view of the mechanism of FIG. 12, using a cam.

FIG. 13 illustrates the use of a shaft 194 having cams 196, 198, 200 and 202 spaced along its length. Each of cams 196, 198, 200 and 202 pushes against rods 196A, 198A, 200A and 202A, respectively, as the shaft 194 may be rotated. Springs 196B, 198B, 200B and 202B return rods 196A, 198A, 200A and 202A back to their original position or beyond, as the case may be. The cams 196, 198, 200 and 202 may be oriented differently to thereby produce varying push or pulls in the direction indicated by the double arrow marked with reference numeral 204. FIG. 14 illustrates a side view of cam 196, rod 196A and spring 196B, representative of the other cams, etc. As the cam 196 may be oblong in shape, rotating shaft 194 will either push rod 196A or allow spring 196B to pull rod 196A.

Figure 15:
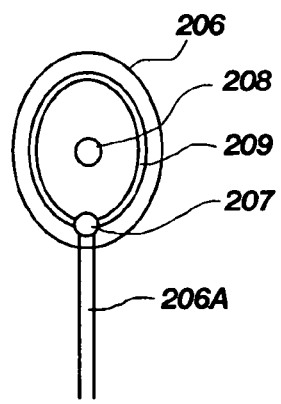
FIG. 15 is a break-away schematic end view of an alternative mechanism of FIG. 12 using a pin and groove mechanism.

FIG. 15 illustrates another method to provide a push or pull force. Cam 206 may be mounted on shaft 208. Rod 206A may be permanently coupled to cam 206 by pin 207 mounted in groove 209. As shaft 208 rotates, rod 206A may be pushed or pulled.

Figure 16:
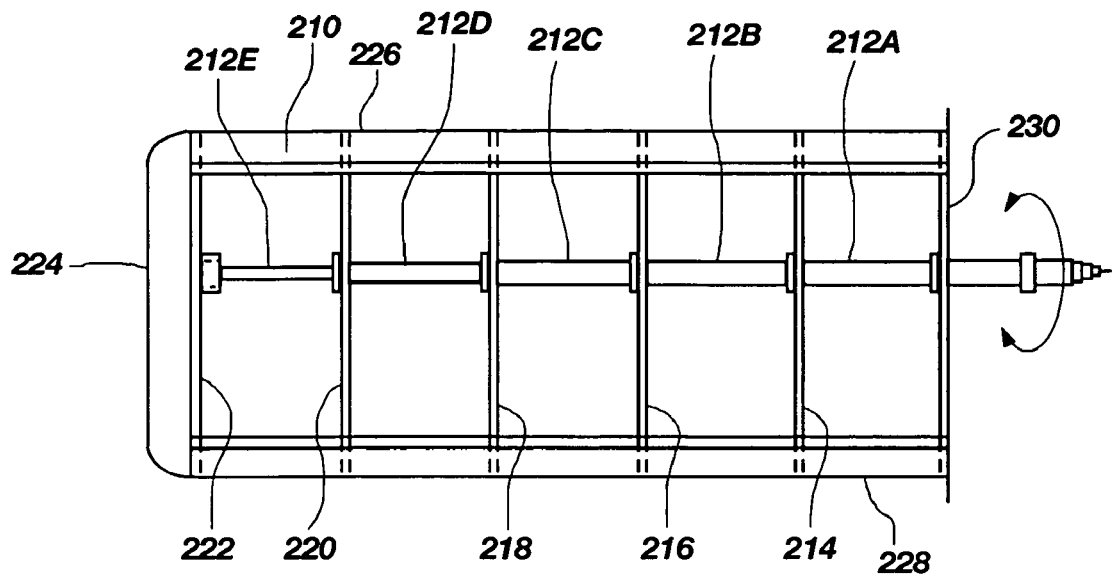
FIG. 16 is a break-away schematic plan view of a wing twistable by a plurality of shafts.
Figure 16A:
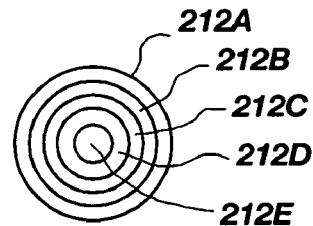
FIG. 16A is an end view of the plurality of shafts shown in FIG. 16 nestled one inside of the other.
Figure 17:
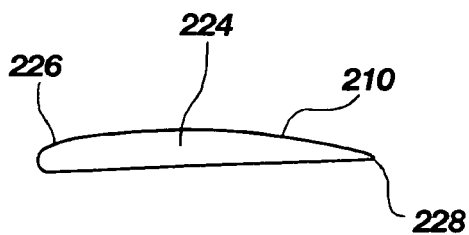
FIG. 17 is an end view of the wing of FIG. 16 in an un-twisted condition.
Figure 18:
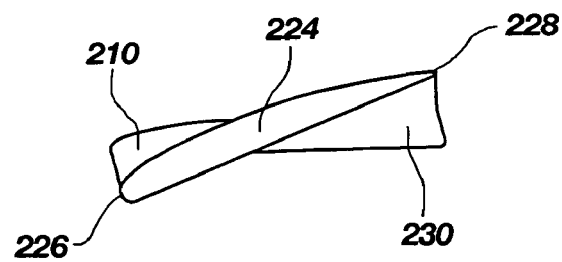
FIG. 18 is an end view of the wing of FIG. 16 in a twisted condition.

FIG. 16 illustrates an illustrative embodiment of a semi-wing 206 having a leading edge 226 and a trailing edge 228 capable of being twisted using pure geometric twist to obtain the optimum twist distribution pursuant to varying optimum twist amounts calculated during flight. A series of successively smaller shafts 212A, 212B, 212C, 212D and 212E extend from the wing root 230 into the wing 210. Shafts 212A, 212B, 212C, 212D each have a hollow interior thereby allowing the smaller diameter shafts to extend through it, as shown in FIG. 16A. One end of each of the shafts, 212A, 212B, 212C, 212D and 212E, may be attached to spars 214, 216, 218, 220, and 222, respectively. The opposite ends of shafts 212A, 212B, 212C, 212D and 212E may be independently rotated from the other shafts, both in direction and magnitude, in accordance with the twist distribution to thereby impart the optimum twist in the wing. The twist amount may be varied in accordance with the twist distribution to maintain the optimum twist throughout the flight. FIG. 17 illustrates semi-wing 210 in an untwisted state. FIG. 18 illustrates semi-wing 210 in a twisted state using solely geometric twist by shafts 212A, 212B, 212C, 212D and 212E.

Figure 19:
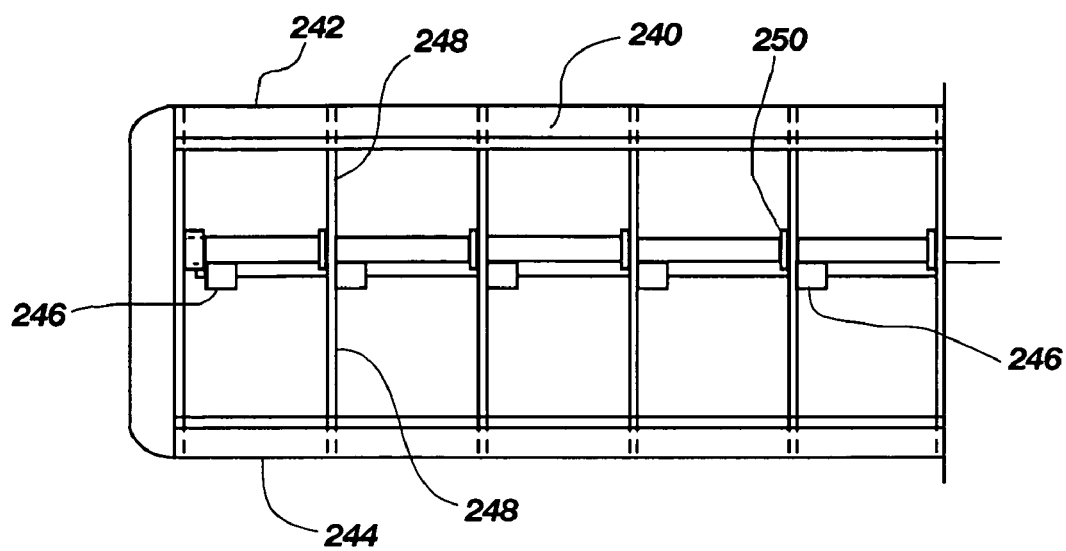
FIG. 19 is a break-away schematic plan view of a wing twistable by a plurality of motors.
Figure 20:
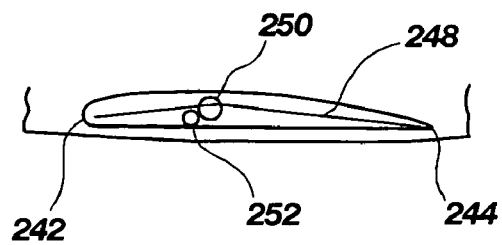
FIG. 20 is a cross-sectional view of the wing of FIG. 18 in an un-twisted condition.

FIG. 19 illustrates an alternative illustrative embodiment of a semi-wing 240 having a leading edge 242 and a trailing edge 244, also capable of being twisted using pure geometric twist similar to the embodiment of FIG. 16. The semi-wing 240 may have one or more motors 246 for imparting a rotational force to supports 248 to cause the semi-wing 240 to twist. As shown in FIG. 20, which shows a cross-sectional break-away view of the semi-wing 240 of FIG. 19, the supports 248 may be rigidly attached to rotation members 250. It will be understood that the rotation members 250 may include gears or wheels, for example, which may be driven by a rotational output member 252 of the motor 246. The output member 252 may also be configured as a gear configured to mesh with the rotation member 250 to transfer a rotational force from the output member 252 to the rotation member 250. Alternatively, the output member 252 may be in the form of a wheel for driving a belt to transfer a rotational force to the rotation member 250. It will be understood that any variety of mechanical torque transmitting devices may be used within the scope of the present disclosure to transfer a rotational force from the motor 246 to the rotating member 250. It will also be understood that any number of motors 246 may be used, and the motors 246 may be operated independently to vary the twist at a particular location.

Figure 21:
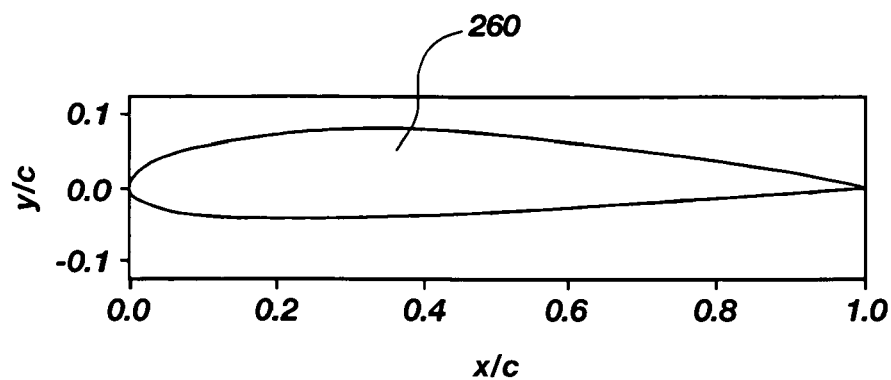
FIG. 21 is an airfoil cross section.

FIGS. 21–25 are illustrative examples of geometric twist and aerodynamic twist that may be employed to impart a twist distribution to a wing in accordance with the principles of the present disclosure. In FIGS. 21–24, there is shown various airfoil sections imposed on a normalized y/c axis and an x/c axis. Referring now to FIG. 21, there is shown an example of a root airfoil cross-section 260 for a typical wing (in this example, the airfoil cross-section 260 has 2.0 percent camber, no geometric twist, and no flap twist).

Figure 22:
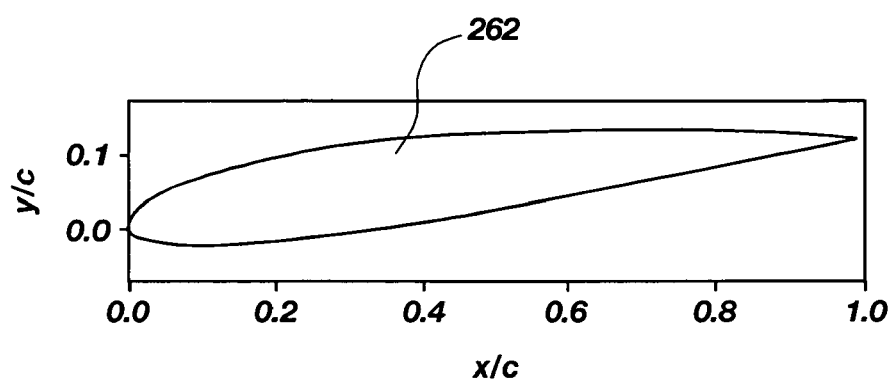
FIG. 22 is an airfoil cross section.
Figure 23:
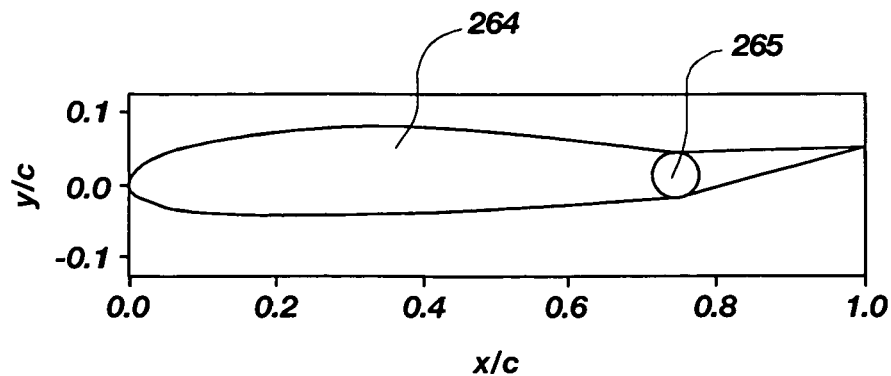
FIG. 23 is an airfoil cross section.
Figure 24:
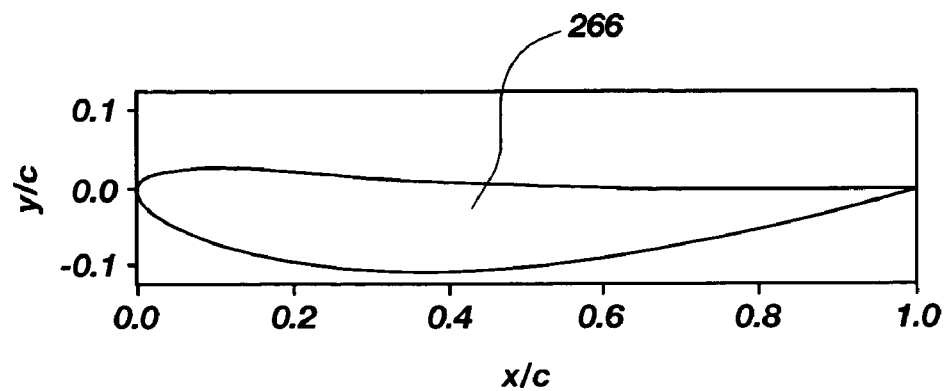
FIG. 24 is an airfoil cross section.
Figure 25:
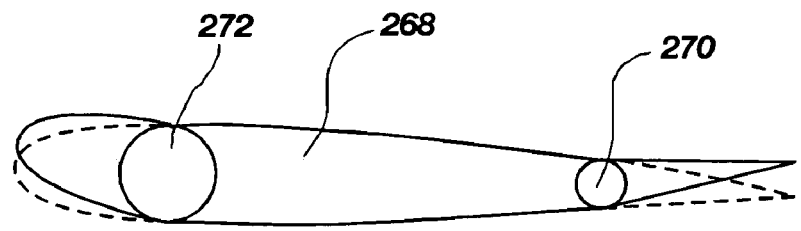
FIG. 25 is an airfoil cross section.

In FIG. 22, there is shown an example of an outboard airfoil cross-section 262 for a typical wing implementing geometric twist (in this example, the airfoil cross-section 262 is shown with 2.0 percent camber, no flap twist, and 7 degrees of geometric twist, relative to the airfoil cross-section shown in FIG. 21). In FIG. 23 there is shown an example of an outboard airfoil cross-section 264 for a typical wing implementing aerodynamic twist by means of trailing-edge flap twist (in this example, the airfoil cross-section 264 is shown with 2.0 percent camber, no geometric twist, and 11.6 degrees flap twist, which is equivalent to 7 degrees of geometric twist, relative to the airfoil cross-section shown in FIG. 21). In FIG. 24 there is shown an example of an outboard airfoil cross-section 266 for a typical wing implementing aerodynamic twist by means of camber-line deformation (in this example, the airfoil cross-section 266 is shown with no geometric twist, no flap twist, and −4.5 percent camber, which is equivalent to 7 degrees of geometric twist, relative to the airfoil cross-section shown in FIG. 21). In FIG. 25 there is shown an example of an outboard airfoil cross-section 268 for a typical wing implementing aerodynamic twist by means of camber-line deformation at two discrete hinge points 270 and 272.

Thus, the common factor in all aerodynamic twist is that the airfoil camber line is changed at one or more points between the leading and trailing edges of the outboard airfoil cross-sections. The example of aerodynamic twist that is shown in FIG. 23 has the camber line bent at single hinge point 265, which in that example is the 75 percent chord (corresponding to a 25 percent flap fraction). It is also possible to bend the airfoil camber line at more than one discrete hinge point. For example, FIG. 25 shows an airfoil cross-section with the airfoil camber line bent at two discrete hinge points, 270 and 272. This concept is easily extended to an arbitrary number of hinge points located between the leading and trailing edges of the outboard airfoil cross-sections. The example of aerodynamic twist that is illustrated in FIG. 24 is simply the limiting case where the airfoil camber line is bent at an infinite number of points between the leading and trailing edges of the outboard airfoil cross-sections. Thus, it should be understood that the present disclosure may be implemented using either geometric or aerodynamic twist. Further, there is no requirement that an infinite number of hinge points be used, but instead it is to be understood that only a finite amount are required to achieve the wing twist necessary.

In practice, embodiments of the present disclosure may take several forms due to the many known ways to implement wing twist using geometric or aerodynamic twist, some of which have been disclosed herein. Significantly, the present disclosure is not limited to the optimum twist distributions and optimum twist amounts based upon the formulas disclosed herein. Other twist distribution and twist amount formulas now known or known in the future may likewise fall under the present disclosure as long as they are used to vary wing twist during flight in order to minimize induced drag in response to one or more of the parameters defining the lift coefficient.

It will be appreciated that the structure and apparatus disclosed herein is merely one example of a means for determining an amount of twist, and it should be appreciated that any structure, apparatus or system for determining an amount of twist which performs functions the same as, or equivalent to, those disclosed herein are intended to fall within the scope of a means for determining an amount of twist, including those structures, apparatus or systems for determining an amount of twist which are presently known, or which may become available in the future. Anything which functions the same as, or equivalently to, a means for determining an amount of twist falls within the scope of this element.

It will be appreciated that the structure and apparatus disclosed herein is merely one example of a means for applying a twist, and it should be appreciated that any structure, apparatus or system for applying a twist which performs functions the same as, or equivalent to, those disclosed herein are intended to fall within the scope of a means for applying a twist, including those structures, apparatus or systems for applying a twist which are presently known, or which may become available in the future. Anything which functions the same as, or equivalently to, a means for applying a twist falls within the scope of this element.

Those having ordinary skill in the relevant art will appreciate the advantages provided by the features of the present disclosure. For example, it is a feature of the present disclosure to provide a method for varying the twist on a wing such that the induced drag can be minimized during flight for various operating conditions. Another feature of the present disclosure is to provide a method for varying the twist pursuant to an optimized twist distribution such that the induced drag is minimized to approximate the same minimum induced drag of an elliptic wing having the same aspect ratio. Another feature of the present invention is to provide a method for varying the twist in a wing responsive to one, some or all of the parameters defining the lift coefficient. Still another feature of the present invention is to provide a control system for varying the twist amount on a wing pursuant to a desired twist distribution.

Those having ordinary skill in the relevant art will appreciate the advantages provided by the features of the present disclosure. In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for reducing induced drag on a wing of a vehicle, said method comprising the steps of:
   a) determining an airspeed of said vehicle;
   b) forming a twist on at least a portion of said wing based at least in part upon said airspeed of said vehicle; and
   c) varying said twist based at least in part upon changes in said airspeed of said vehicle.

2. The method of claim 1, further comprising the step of determining a twist distribution to be applied to said at least a portion of said wing.

3. The method of claim 2, wherein said twist distribution is determined by the equation $$\omega(y) = 1 - \frac{\sqrt{1-(2y/b)^2}}{c(y)/c_{root}}$$

where $\omega(z)$ is said twist distribution, z is a distance from a root of the wing, b is a wingspan, c(z) is a local wing section chord length, and $c_{root}$ is a root wing section chord length.

4. The method of claim 1, further comprising determining a weight of said vehicle.

5. The method of claim 4, further comprising forming said twist on said at least a portion of said wing based at least in part upon said weight of said vehicle.

6. The method of claim 5, further comprising varying said twist based at least in part upon changes in said weight of said vehicle.

7. The method of claim 1, further comprising the step of determining an air density.

8. The method of claim 7, further comprising forming said twist on said at least a portion of said wing based at least in part upon said air density.

9. The method of claim 8, further comprising varying said twist based at least in part upon changes in said air density.

10. The method of claim 1, further comprising the step of determining a load factor of said vehicle.

11. The method of claim 10, further comprising forming said twist on said at least a portion of said wing based at least in part upon said load factor of said vehicle.

12. The method of claim 11, further comprising varying said twist based at least in part upon changes in said load factor of said vehicle.

13. The method of claim 1, further comprising the step of determining a wing area of said vehicle.

14. The method of claim 13, further comprising forming said twist on said at least a portion of said wing based at least in part upon said wing area of said vehicle.

15. The method of claim 14, further comprising varying said twist based at least in part upon changes in said wing area of said vehicle.

16. The method of claim 1, further comprising forming said twist on said at least a portion of said wing in a helical manner.

17. The method of claim 1, further comprising determining a lift coefficient for the wing.

18. The method of claim 17, wherein the lift coefficient is based upon the airspeed of the vehicle, a weight of the vehicle, a load factor, an air density, and a wing area.

19. The method of claim 18, wherein the lift coefficient is calculated by the equation $$C_L = \frac{Wn}{\frac{1}{2}\rho V^2 S_w}$$

where $C_L$ is the lift coefficient, W is the vehicle weight, n is the load factor, $\rho$ is the air density, V is the airspeed of the vehicle, and $S_W$ is the wing area.

20. The method of claim 19, wherein said twist is determined by the equation $$(\delta_t)_{opt} = \frac{2(1+R_T)C_L}{\pi \tilde{C}_{L,\alpha} \varepsilon_f}$$

where $(\delta_t)_{OPT}$ is the twist, $R_T$ is a wing taper ratio, $C_L$ is a lift coefficient, $\tilde{C}_{L,\alpha}$ is an airfoil section lift slope, and $\epsilon_f$ is a local airfoil section flap effectiveness.

21. The method of claim 20, wherein the local airfoil section flap effectiveness $\epsilon_f$ is determined by the equations $$\varepsilon_f = 1 - \frac{\theta_f - \sin\theta_f}{\pi} \quad \text{and}$$

$$\theta_f = \cos^{-1}(2c_f/c)$$

where $c_f$ is a chord length of a flap and c is an entire chord length.

22. The method of claim 1, wherein said twist is optimized to produce induced drag at substantially the same level as an elliptical wing.

23. The method of claim 1, wherein said at least a portion of said wing comprises an entire cross section of said wing.

24. The method of claim 1, wherein said at least a portion of said wing comprises an edge flap on said wing.

25. The method of claim 1, wherein said twist is determined by the equation $$(\delta_t)_{opt} = \frac{\kappa_{DL} C_L}{2\kappa_{D\Omega} C_{L,\alpha} \varepsilon_f}$$

where $\kappa_{DL}$ is a lift washout contribution to induced drag factor, $C_L$ is a lift coefficient, $\kappa_{D\Omega}$ is a washout contribution to induced drag factor, $C_{L,\alpha}$ is a wing lift slope, and $\epsilon_f$ is an airfoil section flap effectiveness.

26. The method of claim 2, wherein said twist distribution is determined by the equation $$\omega(\theta) = 1 - \frac{\sin(\theta)}{c(\theta)/c_{root}}$$

where $\omega(\theta)$ is said twist distribution, $c(\theta)$ is a local wing section chord length, $c_{root}$ is a root wing section chord length and $$\theta = \cos^{-1}(-2y/b)$$

where z is a distance from a root of the wing and b is a wingspan.

27. The method of claim 1, wherein said twist is determined by the equation $$(\delta_t)_{opt} = \frac{4C_L}{\pi \tilde{C}_{L,\alpha} \varepsilon_f}$$

where $C_L$ is a lift coefficient, $\tilde{C}_{L,\alpha}$ is an airfoil section lift slope, and $\varepsilon_f$ is an airfoil section flap effectiveness.

28. The method of claim 1, wherein said twist is determined by the equation $$(\delta_t)_{opt} = \frac{2(1+R_T)C_L}{\pi \tilde{C}_{L,\alpha} \varepsilon_f}$$

where $C_L$ is a lift coefficient, $R_T$ is a wing taper ratio, $c_{tip}/c_{root}$, $c_{tip}$ is a wingtip section chord length, $c_{root}$ is a wingroot section chord length, $\tilde{C}_{L,\alpha}$ is a airfoil section lift slope, and $\varepsilon_f$ is an airfoil section flap effectiveness.

29. A method for reducing induced drag on a wing of a vehicle, said method comprising the steps of:
 a) determining a weight of said vehicle;
 b) forming a twist on at least a portion of said wing based at least in part upon said weight of said vehicle; and
 c) varying said twist based at least in part upon changes in said weight of said vehicle.

30. The method of claim 29, further comprising the step of determining a twist distribution to be applied to said at least a portion of said wing.

31. The method of claim 29, further comprising determining an airspeed of said vehicle.

32. The method of claim 31, further comprising forming said twist on said at least a portion of said wing based at least in part upon said airspeed of said vehicle.

33. The method of claim 32, further comprising varying said twist based at least in part upon changes in said airspeed of said vehicle.

34. The method of claim 29, further comprising forming said twist on said at least a portion of said wing in a helical manner.

35. The method of claim 29, further comprising determining a lift coefficient for the wing, said lift coefficient being based upon an airspeed of the vehicle, the weight of the vehicle, a load factor, an air density, and a wing area.

36. The method of claim 29, wherein said at least a portion of said wing comprises an entire cross section of said wing.

37. The method of claim 29, wherein said at least a portion of said wing comprises an edge flap on said wing.

38. A method for reducing induced drag on a wing of a vehicle, said method comprising the steps of:
 a) determining an air density;
 b) forming a twist on at least a portion of said wing based at least in part upon said air density; and
 c) varying said twist based at least in part upon changes in said air density.

39. The method of claim 38, further comprising the step of determining a twist distribution to be applied to said at least a portion of said wing.

40. The method of claim 38, further comprising determining an airspeed of said vehicle.

41. The method of claim 40, further comprising forming said twist on said at least a portion of said wing based at least in part upon said airspeed of said vehicle.

42. The method of claim 41, further comprising varying said twist based at least in part upon changes in said airspeed of said vehicle.

43. The method of claim 38, further comprising forming said twist on said at least a portion of said wing in a helical manner.

44. The method of claim 38, further comprising determining a lift coefficient for the wing, said lift coefficient being based upon an airspeed of the vehicle, a weight of the vehicle, a load factor, the air density, and a wing area.

45. The method of claim 38, wherein said at least a portion of said wing comprises an entire cross section of said wing.

46. The method of claim 38, wherein said at least a portion of said wing comprises an edge flap on said wing.

47. A method for reducing induced drag on a wing of a vehicle, said method comprising the steps of:
 a) determining a load factor of said vehicle;
 b) forming a twist on at least a portion of said wing based at least in part upon said load factor of said vehicle; and
 c) varying said twist based at least in part upon changes in said load factor of said vehicle.

48. The method of claim 47, further comprising the step of determining a twist distribution to be applied to said at least a portion of said wing.

49. The method of claim 47, further comprising determining an airspeed of said vehicle.

50. The method of claim 49, further comprising forming said twist on said at least a portion of said wing based at least in part upon said airspeed of said vehicle.

51. The method of claim 50, further comprising varying said twist based at least in part upon changes in said airspeed of said vehicle.

52. The method of claim 47, further comprising forming said twist on said at least a portion of said wing in a helical manner.

53. The method of claim 47, further comprising determining a lift coefficient for the wing, said lift coefficient being based upon an airspeed of the vehicle, a weight of the vehicle, the load factor, an air density, and a wing area.

54. The method of claim 47, wherein said at least a portion of said wing comprises an entire cross section of said wing.

55. The method of claim 47, wherein said at least a portion of said wing comprises an edge flap on said wing.

56. A method for reducing induced drag on a wing of a vehicle, said method comprising the steps of:
 a) determining a wing area of said vehicle;
 b) forming a twist on at least a portion of said wing based at least in part upon said wing area of said vehicle; and
 c) varying said twist based at least in part upon changes in said wing area of said vehicle.

57. The method of claim 56, further comprising the step of determining a twist distribution to be applied to said at least a portion of said wing.

58. The method of claim 56, further comprising determining an airspeed of said vehicle.

59. The method of claim 58, further comprising forming said twist on said at least a portion of said wing based at least in part upon said airspeed of said vehicle.

60. The method of claim 59, further comprising varying said twist based at least in part upon changes in said airspeed of said vehicle.

61. The method of claim 56, further comprising forming said twist on said at least a portion of said wing in a helical manner.

62. The method of claim 56, further comprising determining a lift coefficient for the wing, said lift coefficient being based upon an airspeed of the vehicle, a weight of the vehicle, a load factor, an air density, and the wing area.

63. The method of claim 56, wherein said at least a portion of said wing comprises an entire cross section of said wing.

64. The method of claim 56, wherein said at least a portion of said wing comprises an edge flap on said wing.

65. A method for reducing induced drag on a wing of a vehicle, said method comprising the steps of:
  a) determining a twist required for reduced induced drag based on operating conditions of said vehicle;
  b) forming said twist on at least a portion of said wing; and
  c) varying said twist based on changes in said operating conditions.

66. The method of claim 65, further comprising the step of determining a twist distribution to be applied to said at least a portion of said wing.

67. The method of claim 65, further comprising determining an airspeed of said vehicle.

68. The method of claim 67, further comprising forming said twist on said at least a portion of said wing based at least in part upon said airspeed of said vehicle.

69. The method of claim 68, further comprising varying said twist based at least in part upon changes in said airspeed of said vehicle.

70. The method of claim 65, further comprising forming said twist on said at least a portion of said wing in a helical manner.

71. The method of claim 65, further comprising determining a lift coefficient for the wing, said lift coefficient being based upon an airspeed of the vehicle, a weight of the vehicle, a load factor, an air density, and a wing area.

72. The method of claim 65, wherein said at least a portion of said wing comprises an entire cross section of said wing.

73. The method of claim 65, wherein said at least a portion of said wing comprises an edge flap on said wing.

74. The method of claim 65, further comprising:
  d) determining a twist distribution to be applied to said at least a portion of said wing, said twist distribution being determined by the equation $$\omega(y) = 1 - \frac{\sqrt{1-(2y/b)^2}}{c(y)/c_{root}}$$

where $\omega(z)$ is said twist distribution, z is a distance from a root of the wing, b is a wingspan, c is a local wing section chord length, and $c_{root}$ is a root wing section chord length;

wherein step a further comprises determining an airspeed of said vehicle, determining a weight of said vehicle, determining an air density, determining a load factor of said vehicle, and determining a wing area of said vehicle, wherein a lift coefficient is calculated by the equation $$C_L = \frac{Wn}{\frac{1}{2}\rho V^2 S_w}$$

where $C_L$ is the lift coefficient, W is the vehicle weight, n is the load factor, $\rho$ is the air density, V is the airspeed of the vehicle, and $S_W$ is the wing area;

wherein the twist is determined by the equation $$(\delta_t)_{opt} = \frac{2(1+R_T)C_L}{\pi \tilde{C}_{L,\alpha} \varepsilon_f}$$

where $R_T$ is a wing taper ratio, $C_L$ is the lift coefficient, $\tilde{C}_{L,\alpha}$ is an airfoil section lift slope, and $\varepsilon_f$ is a local airfoil section flap effectiveness;

wherein the local airfoil section flap effectiveness $\varepsilon_f$ is determined by the equations $$\varepsilon_f = 1 - \frac{\theta_f - \sin\theta_f}{\pi} \text{ and } \theta_f = \cos^{-1}(2c_f/c)$$

where $c_f$ is a chord length of a flap and c is an entire chord length.

75. A method for reducing induced drag on a wing of a vehicle, said method comprising the steps of:
  a) providing said wing with a twistable portion, said twistable portion being twistable in a helical manner;
  b) determining a configuration of said twistable portion during operation of said aircraft to provide reduced induced drag; and
  c) twisting said twistable portion to said configuration.

76. The method of claim 75, further comprising the step of determining a twist distribution to be applied to said twistable portion, and undertaking step (c) responsive to said twist distribution.

77. The method of claim 75, further comprising determining an airspeed of said vehicle.

78. The method of claim 77, wherein the step of twisting said twistable portion is based at least in part upon said airspeed of said vehicle.

79. The method of claim 78, wherein said configuration varies based at least in part upon changes in said airspeed of said vehicle.

80. The method of claim 75, further comprising determining said configuration based upon an airspeed of the vehicle, a weight of the vehicle, a load factor, an air density, and a wing area.

81. The method of claim 75, wherein said twistable portion comprises an entire cross section of said wing.

82. The method of claim 75, wherein said twistable portion comprises an edge flap on said wing.

83. A vehicle comprising:
a wing comprising a twistable portion; and
a control system for adjusting the twistable portion;
wherein the twistable portion is adjusted by the control system in response to operating conditions to thereby reduce induced drag.

84. The vehicle of claim 83, wherein the twistable portion is a trailing edge flap on said wing.

85. The vehicle of claim 83, wherein the twistable portion comprises an entire cross section of said wing.

86. The vehicle of claim 83, wherein said twistable portion is configured to twist in a helical manner.

87. The vehicle of claim 83, further comprising at least one sensor for monitoring operating conditions.

88. The vehicle of claim 87, further comprising a computer for receiving data from the at least one sensor and for calculating a twist amount based upon said data.

89. The vehicle of claim 83, wherein the control system comprises a push rod.

90. The vehicle of claim 83, wherein the wing has a variable area.

91. The vehicle of claim 83, wherein the wing has a rectangular planform.

92. The vehicle of claim 83, wherein the wing has a tapered planform.

93. A system for reducing induced drag on a vehicle, said system comprising:
at least one sensor for monitoring operating conditions;
a computer for receiving data from the at least one sensor and for calculating a twist amount based upon said data; and
a control system for applying the twist amount on at least a portion of a wing to thereby reduce induced drag.

94. The system of claim 93, wherein the at least one sensor is configured to determine an airspeed of the vehicle.

95. The system of claim 93, wherein the at least one sensor is configured to determine a weight of the vehicle.

96. The system of claim 93, wherein the at least one sensor is configured to determine an air density.

97. The system of claim 93, wherein the at least one sensor is configured to determine a load factor.

98. The system of claim 93, wherein the at least one sensor is configured to determine a wing area.

99. The system of claim 93, wherein the control system comprises a rod for applying the twist to the at least a portion of the wing.

100. The system of claim 99, further comprising a motor for driving the rod.

101. The system of claim 99, further comprising a cogwheel for driving the rod.

102. The system of claim 99, further comprising a hydraulic actuator for driving the rod.

103. The system of claim 99, further comprising a mechanical screw actuator for driving the rod.

104. The system of claim 99, further comprising a rotating shaft having a cam for driving the rod.

105. The system of claim 99, wherein the rod is spring biased to contact the cam.

106. The system of claim 105, wherein the rod is connected to a groove on the cam to thereby produce both a push and a pull on the rod.

107. The system of claim 93, wherein the control system comprises a rotating shaft for applying the twist to the at least a portion of the wing.

108. The system of claim 93, wherein the control system comprises a plurality of rotating shafts for applying the twist to the at least a portion of the wing.

109. The system of claim 93, wherein the control system comprises at least one motor for supplying a rotational force to apply the twist to the at least a portion of the wing.

110. A system for reducing induced drag on a vehicle, said system comprising:
means for determining an amount of twist to be applied to at least a portion of a wing for the purpose of reducing induced drag; and
means for applying a twist to said at least a portion of said wing.

111. The system of claim 110, wherein the means for determining an amount of twist to be applied comprises at least one sensor.

112. The system of claim 111, wherein the at least one sensor is configured to determine at least one of the group consisting of an airspeed of the vehicle, a weight of the vehicle, an air density, a load factor, and a wing area.

113. The system of claim 110, wherein the means for determining an amount of twist to be applied comprises a computer for receiving data and calculating said twist amount.

114. The system of claim 110, wherein the means for applying a twist comprises a rod.

115. The system of claim 114, wherein the means for applying a twist includes at least one of the group consisting of a cogwheel, a hydraulic actuator, a mechanical screw actuator, and a rotating shaft.

116. The system of claim 110, wherein the means for applying a twist comprises at least one motor for supplying a rotational force.

117. A method for reducing induced drag on a wing of a vehicle, said method comprising the steps of:
a) determining a twist distribution to be applied to said wing for the purpose of reducing induced drag;
b) varying a twist on at least a portion of said wing in accordance with said twist distribution while said vehicle is in operation.

118. The method of claim 117, wherein said twist distribution is determined by the equation $$\omega(y) = 1 - \frac{\sqrt{1-(2y/b)^2}}{c(y)/c_{root}}$$

where $\omega(z)$ is said twist distribution, z is a distance from a root of the wing, b is a wingspan, c is a local wing section chord length, and $c_{root}$ is a root wing section chord length.

119. The method of claim 117, further comprising determining an airspeed of said vehicle.

120. The method of claim 119, further comprising forming said twist on said at least a portion of said wing based at least in part upon said airspeed of said vehicle.

121. The method of claim 120, further comprising varying said twist based at least in part upon changes in said airspeed of said vehicle.

122. The method of claim 117, further comprising forming said twist on said at least a portion of said wing in a—helical manner.

123. The method of claim 117, further comprising determining a lift coefficient for the wing, said lift coefficient being based upon an airspeed of the vehicle, the weight of the vehicle, a load factor, an air density, and a wing area.

124. The method of claim 117, wherein said at least a portion of said wing comprises an entire cross section of said wing.

125. The method of claim 117, wherein said at least a portion of said wing comprises an edge flap on said wing.

126. The method of claim 117, wherein the twist on the at least a portion of the wing is configured to correspond to the twist distribution.

127. The method of claim 117, wherein the twist on the at least a portion of the wing is configured to correspond to a portion of the twist distribution.

128. A method for reducing induced drag on a wing of a vehicle, said method comprising the steps of:
   a) determining an airspeed of said vehicle;
   b) changing a camber of a portion of said wing based at least in part upon said airspeed of said vehicle; and
   c) varying said camber based at least in part upon changes in said airspeed of said vehicle.

129. The method of claim 128, further comprising the step of determining a twist distribution to be applied to said at least a portion of said wing.

130. The method of claim 129, wherein said twist distribution is determined by the equation $$\omega(y) = 1 - \frac{\sqrt{1-(2y/b)^2}}{c(y)/c_{root}}$$

where $\omega(z)$ is said twist distribution, z is a distance from a root of the wing, b is a wingspan, c(z) is a local wing section chord length, and $c_{root}$ is a root wing section chord length.

131. The method of claim 128, further comprising determining a weight of said vehicle.

132. The method of claim 131, further comprising changing said camber of said at least a portion of said wing based at least in part upon said weight of said vehicle.

133. The method of claim 132, further comprising changing said camber of said at least in part upon changes in said weight of said vehicle.

134. The method of claim 128, further comprising the step of determining an air density.

135. The method of claim 134, further comprising changing said camber of said at least a portion of said wing based at least in part upon said air density.

136. The method of claim 135, further comprising changing said camber of said at least in part upon changes in said air density.

137. The method of claim 128, further comprising the step of determining a load factor of said vehicle.

138. The method of claim 137, further comprising changing said camber of said at least a portion of said wing based at least in part upon said load factor of said vehicle.

139. The method of claim 138, further comprising determining said load factor using sensors on said vehicle.

140. The method of claim 128, further comprising the step of determining a wing area of said vehicle.

141. The method of claim 140, further comprising changing said camber of said at least a portion of said wing based at least in part upon said wing area of said vehicle.

142. The method of claim 141, further comprising changing said camber of said at least a portion of said wing based at least in part upon changes in said wing area of said vehicle.

143. The method of claim 128, further comprising determining a lift coefficient for the wing.

144. The method of claim 143, wherein the lift coefficient is based upon the airspeed of the vehicle, a weight of the vehicle, a load factor, an air density, and a wing area.

145. The method of claim 144, wherein the lift coefficient is calculated by the equation $$C_L = \frac{Wn}{\frac{1}{2}\rho V^2 S_w}$$

where $C_L$ is the lift coefficient, W is the vehicle weight, n is the load factor, $\rho$ is the air density, V is the airspeed of the vehicle, and $S_W$ is the wing area.

146. The method of claim 145, wherein said twist is determined by the equation $$(\delta_t)_{opt} = \frac{2(1+R_T)C_L}{\pi \tilde{C}_{L,\alpha} \varepsilon_f}$$

where $R_T$ is a wing taper ratio, $C_L$ is a lift coefficient, $\tilde{C}_{L,\alpha}$ is an airfoil section lift slope, and $\varepsilon_f$ is a local airfoil section flap effectiveness.

147. The method of claim 146, wherein the local airfoil section flap effectiveness $\varepsilon_f$ is determined by the equations $$\varepsilon_f = 1 - \frac{\theta_f - \sin\theta_f}{\pi} \quad \text{and} \quad \theta_f = \cos^{-1}(2c_f/c)$$

where $c_f$ is a chord length of a flap and c is an entire chord length.

148. The method of claim 128, wherein the changing of the camber is optimized to produce induced drag at substantially the same level as an elliptical wing.

149. The method of claim 128, wherein said at least a portion of said wing comprises an entire cross section of said wing.

150. The method of claim 128, wherein said at least a portion of said wing comprises an edge flap on said wing.

151. The method of claim 128, wherein said twist is determined by the equation $$(\delta_t)_{opt} = \frac{\kappa_{DL} C_L}{2\kappa_{D\Omega} C_{L,\alpha} \varepsilon_f}$$

where $\kappa_{DL}$ is a lift washout contribution to induced drag factor, $C_L$ is a lift coefficient, $\kappa_{D\Omega}$ is a washout contribution to induced drag factor, $C_{L,\alpha}$ is a wing lift slope, and $\varepsilon_f$ is an airfoil section flap effectiveness.

152. The method of claim 129, wherein said twist distribution is determined by the equation $$\omega(\theta) = 1 - \frac{\sin(\theta)}{c(\theta)/c_{root}}$$

where $\omega(\theta)$ is said twist distribution, $c(\theta)$ is a local wing section chord length, $c_{root}$ is a root wing section chord length and $$\theta = \cos^{-1}(-2y/b)$$

where z is a distance from a root of the wing and b is a wingspan.

153. The method of claim 128, wherein said twist is determined by the equation $$(\delta_t)_{opt} = \frac{4C_L}{\pi \tilde{C}_{L,\alpha} \varepsilon_f}$$

where $C_L$ is a lift coefficient, $\tilde{C}_{L,\alpha}$ is an airfoil section lift slope, and $\epsilon_f$ is an airfoil section flap effectiveness.

154. The method of claim 128, wherein said twist is determined by the equation $$(\delta_t)_{opt} = \frac{2(1 + R_T)C_L}{\pi \tilde{C}_{L,\alpha} \varepsilon_f}$$

where $C_L$ is a lift coefficient, $R_T$ is a wing taper ratio, $c_{tip}/c_{root}$, $c_{tip}$ is a wingtip section chord length, $c_{root}$ is a wingroot section chord length, $\tilde{C}_{L,\alpha}$ is a airfoil section lift slope, and $\epsilon_f$ is an airfoil section flap effectiveness.

* * * * *